US012540058B2

(12) United States Patent
Tarrant

(10) Patent No.: US 12,540,058 B2
(45) Date of Patent: Feb. 3, 2026

(54) CRANE SYSTEM AND METHOD FOR DELIVERING CRANE FROM FLOOR-TO-FLOOR OF HIGH-RISE BUILDING UNDER CONSTRUCTION

(71) Applicant: Broadway Patents, LLC, New York, NY (US)

(72) Inventor: Patrick M. Tarrant, New York, NY (US)

( * ) Notice: Subject to any disclaimer, the term of this patent is extended or adjusted under 35 U.S.C. 154(b) by 286 days.

(21) Appl. No.: 18/400,538

(22) Filed: Dec. 29, 2023

(65) Prior Publication Data

US 2025/0214812 A1 Jul. 3, 2025

(51) Int. Cl.
*B66C 23/20* (2006.01)
*E04B 1/35* (2006.01)

(52) U.S. Cl.
CPC .............. *B66C 23/202* (2013.01); *E04B 1/35* (2013.01); *E04B 2001/3588* (2013.01)

(58) Field of Classification Search
CPC ..... B66C 23/202; B66C 23/32; B66C 23/283; E04B 1/35; E04B 2001/3588
See application file for complete search history.

(56) References Cited

U.S. PATENT DOCUMENTS 3,333,712 A 8/1967 Owen
3,656,631 A 4/1972 Rauch
3,982,634 A * 9/1976 Miyazaki .............. B66C 23/283 414/12
4,125,193 A * 11/1978 Matsumoto ............. B66C 23/28 254/105
4,205,826 A * 6/1980 Ten Broeke ............ B66C 23/32 254/105
4,374,790 A 2/1983 McGowan
6,226,955 B1 * 5/2001 Lorrigan ................ B66C 23/32 212/270
8,109,291 B2 * 2/2012 Fuegel .................... E04G 21/04 414/10

(Continued)

FOREIGN PATENT DOCUMENTS

CH 417903 A * 7/1966 ........... B66C 23/283
DE 22089111 9/1973

(Continued)

*Primary Examiner* — Patrick J Maestri
(74) *Attorney, Agent, or Firm* — Richard Malagiere, Esq.

(57) ABSTRACT

Disclosed embodiments provide an accelerated construction technique that is well-suited for concrete steel-reinforced buildings. As construction of a building continues, and new floors are built, cutouts in each floor are formed that are vertically aligned with each other to form a multi-floor channel. A climbing hydraulic piston system is installed in the multi-floor channel. The hydraulic piston system lifts a mobile, slab-based mini crane. The climbing hydraulic piston system elevates the crane to a sufficient height to build the next floor slab. Then the crane is lowered onto the slab to be used for construction activities on that floor. The process can be repeated as needed until the final level of the building is constructed. The climbing hydraulic piston systems is then removed from the channel and lowered to the ground by the crane. The crane is then disassembled and removed via the building freight elevator.

25 Claims, 22 Drawing Sheets

(56) References Cited

U.S. PATENT DOCUMENTS

| | | | | |
|---|---|---|---|---|
| 2002/0134745 | A1* | 9/2002 | Jurimae | B66C 23/32 212/179 |
| 2007/0157539 | A1* | 7/2007 | Knigge | B66C 23/286 52/632 |
| 2008/0314853 | A1* | 12/2008 | Knigge | B66C 13/18 212/179 |
| 2020/0284026 | A1* | 9/2020 | Houston | E04B 1/3404 |
| 2020/0340234 | A1* | 10/2020 | Houston | E04B 5/40 |
| 2023/0145996 | A1* | 5/2023 | King | B66C 23/32 212/203 |
| 2023/0374775 | A1* | 11/2023 | Stewart | E04B 1/3511 |

FOREIGN PATENT DOCUMENTS

| | | | | | |
|---|---|---|---|---|---|
| DE | 2434494 | A1 | | 5/1976 | |
| FR | 1453523 | A | * | 6/1966 | E04G 11/22 |
| GB | 964058 | A | * | 7/1964 | B66C 23/32 |
| GB | 1119508 | A | * | 7/1968 | E04H 12/34 |
| GB | 1349499 | A | * | 4/1974 | E04G 11/082 |
| JP | 04-265360 | A2 | | 9/1992 | |

* cited by examiner

CRANE SYSTEM AND METHOD FOR DELIVERING CRANE FROM FLOOR-TO-FLOOR OF HIGH-RISE BUILDING UNDER CONSTRUCTION

FIELD

The present invention relates generally to building construction, and more particularly to a crane system and method for delivering the crane from floor-to-floor of a high rise building during construction.

BACKGROUND

The tower crane is associated with skyscraper construction in urban areas the world over. The tower crane is comprised of a base support—most often a large concrete pad located at the base of the building. The tower, sometimes called a tower, features steel lattice work for extra strength and is attached to the base support. The tower extends up through an interior shaft in the building and rises along with the building. Alternatively, the tower can be placed next to or alongside the building under construction—if space permits—and will similarly rise with the structure as it is being erected. In either case—in building or side configuration—the tower is attached to the building structure by means of tiebacks affixed to the building concrete floor slabs as the building rises located approximately every 100 feet.

The benefit of a tower crane is that it can lift very heavy loads from the ground and bring them up the desired location on the building as it is being constructed. Tower cranes also have a great reach and can pick heavy loads from almost anywhere in the vicinity of the construction site. The drawback to the tower crane is the cost to deliver, erect and breakdown the crane. The set-up cost for a tower crane is between $100,000.00 and $150,000.00. The breakdown cost at the end of the project is comparable. Further, the typical profile of insurance required by the local authority for a tower crane is often very expensive.

By way of background, tower cranes were first used in construction in 1949 when Hans Liebherr built the first example of one to assist in the reconstruction of Germany after the second world war. However, up until the 1960's, high rise buildings continued to use derricks in their construction. Tower cranes came into wide use in the 1960's and derricks were phased out. Initially, one of the most important functions of a tower crane was to hoist concrete to the floor under construction as the building rose. This was done by bringing the concrete to the job site in a specialized truck, pouring the concrete into a bucket which would typically take four yards of concrete weighing 20,000 pounds and lifting the bucket to the floor under construction and emptying the concrete on that floor. Once the bucket was emptied, the bucket would be returned to the street level where it would be filled again by the waiting concrete truck. This cycle would continue until the construction of the building was complete.

A new technology developed over the last two decades that changed the way concrete was brought to a floor of a building under construction. Specifically, concrete is now being discharged from the truck into a hopper at ground level and is then continuously pumped up to the floor under construction through a hose. The concrete is spread by use of a distribution boom which is designed to self-climb as the building progresses. This means that the tower crane is no longer needed to hoist the 20,000-pound buckets of concrete to the floor being constructed as the building rises up. Now the heaviest loads going to the floor under construction are rebar and plywood bundles which do not exceed 4,000 pounds per bundle. So, with the concrete being pumped up to the floor under construction without the need of three-yard buckets, the lifting capacity required by a crane has been reduced substantially.

SUMMARY

In one embodiment, there is provided a method for using a crane for construction of a building with multiple floors, comprising: building a set of initial floors; installing a cutout in each floor of the set of the initial floors; installing upper and lower support collars in the cutouts of one or more floors of the set of initial floors; installing a plurality of lift ladders in a multi-floor channel formed by the cutouts, wherein the plurality of lift ladders is secured to the upper and lower support collars; installing an adjustable locking base coupled to a piston system in the multi-floor channel, wherein the adjustable locking base is secured into the lift ladders; installing a tower coupled to the adjustable locking base and piston system, wherein the tower rides in the multi-floor channel and is advanced by the piston system; positioning a crane over the tower coupled to the piston system; elevating the crane above a level of a next floor to be constructed; building the next floor to be constructed; lowering the crane onto the next floor which has now been constructed; operating the crane on the next floor which has now been constructed.

In another embodiment, there is provided a crane lifting system to lift a crane from floor to floor during construction of a building comprising: a piston system; an adjustable locking base coupled to the piston system; a hydraulic power source coupled to the piston system; and a plurality of lift ladders, wherein the plurality of lift ladders is installed within a multi-floor channel of the building, coupled to an upper support collar and a lower support collar affixed in a multi-floor channel, and wherein the hydraulic power source coupled to the piston system is configured and disposed to move a tower along the multi-floor channel.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity. Furthermore, for clarity, some reference numbers may be omitted in certain drawings.

DETAILED DESCRIPTION

Disclosed embodiments provide a cost-savings innovation to be used on buildings with steel-reinforced concrete floors which by their nature have limited loading capacity. Specifically, the present invention presents a device, method and system for lifting a portable crawler crane from floor slab to floor slab by means of an internal climbing method set out in the instant invention. The crawler crane can operate on each floor slab and pick pallets of building materials from the ground and lift these items to the floor slab on which the crane is located. Since the crawler crane sits and operates on the floor slab, this is not an "in building" crane with its foundation on the ground of the structure and therefore not subject to the same erection/breakdown costs and insurance requirements.

Disclosed embodiments provide an accelerated construction technique that is well-suited for concrete steel-reinforced buildings. Residential buildings in large cities are often built using concrete steel-reinforced construction. For constructing these buildings, disclosed embodiments use a mobile, slab-based crane that sits on the concrete slab of each floor. This is considerably cheaper than a static crane, such as a tower crane, often referred to as an 'in-building' crane. As construction of a building continues, and new floors are built, cutouts in each floor are formed that are vertically aligned with each other to form a multi-floor channel. A climbing hydraulic piston system is installed in the multi-floor channel. In embodiments, the hydraulic piston may be referred to as a "tower" and the hydraulic piston system may be referred to as a "tower system." The climbing hydraulic piston system elevates the mobile crane to a sufficient height to build the next floor slab. Then the crane is lowered onto the slab to be used for construction activities on that floor. The process can be repeated as needed until the final level of the building is constructed. Disclosed embodiments eliminate the need for an in-building crane, thereby providing considerable cost savings in the construction of concrete steel-reinforced buildings.

Figure 1:
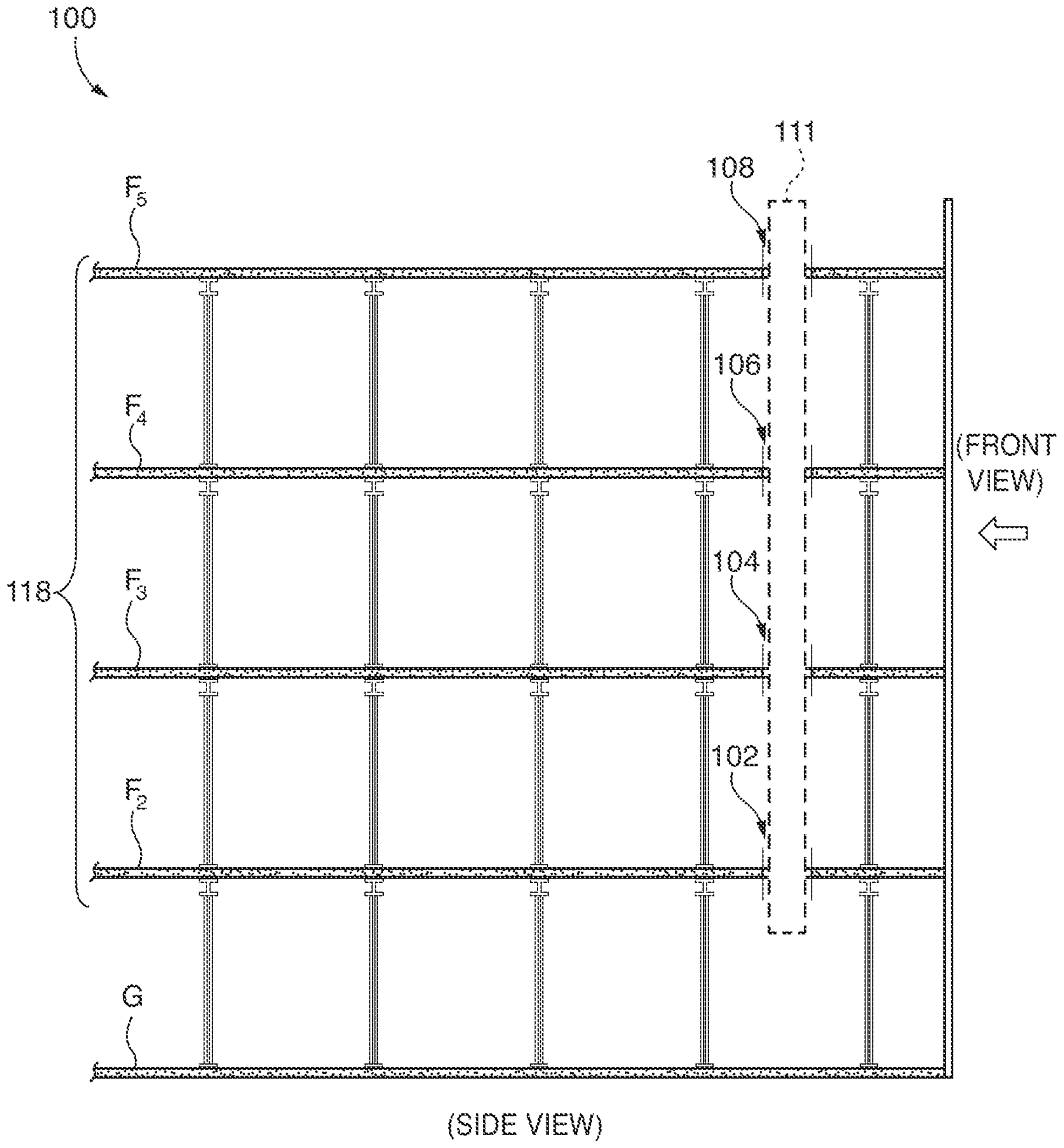
FIG. 1 is a side view of a starting configuration for embodiments of the present invention.

FIG. 1 is a side view 100 of a starting configuration for embodiments of the present invention. An initial set of floors 118 of the multi-floor building are constructed. In FIG. 1, the initial set of floors (levels) comprises four floors, indicated as F2-F5, that are built over a ground level, indicated as G. Each floor of the initial set of floors has a cutout formed therein. Floor F2 has cutout 102, floor F3 has cutout 104, floor F4 has cutout 106, and floor F5 has cutout 108. In embodiments, the cutouts can be square. In some embodiments, the cutouts have a size ranging from three feet square to four feet square. Other shapes and sizes of cutouts are possible with disclosed embodiments. The cutouts of each floor of the initial set of floors are vertically aligned with each other, so as to form a multi-floor channel, as indicated by 111. Channel 111 is used for assembly of a climbing hydraulic piston system suitable for lifting a slab-based crane, greatly accelerating building construction while at the same time reducing cost using methods described herein.

Figure 2A:
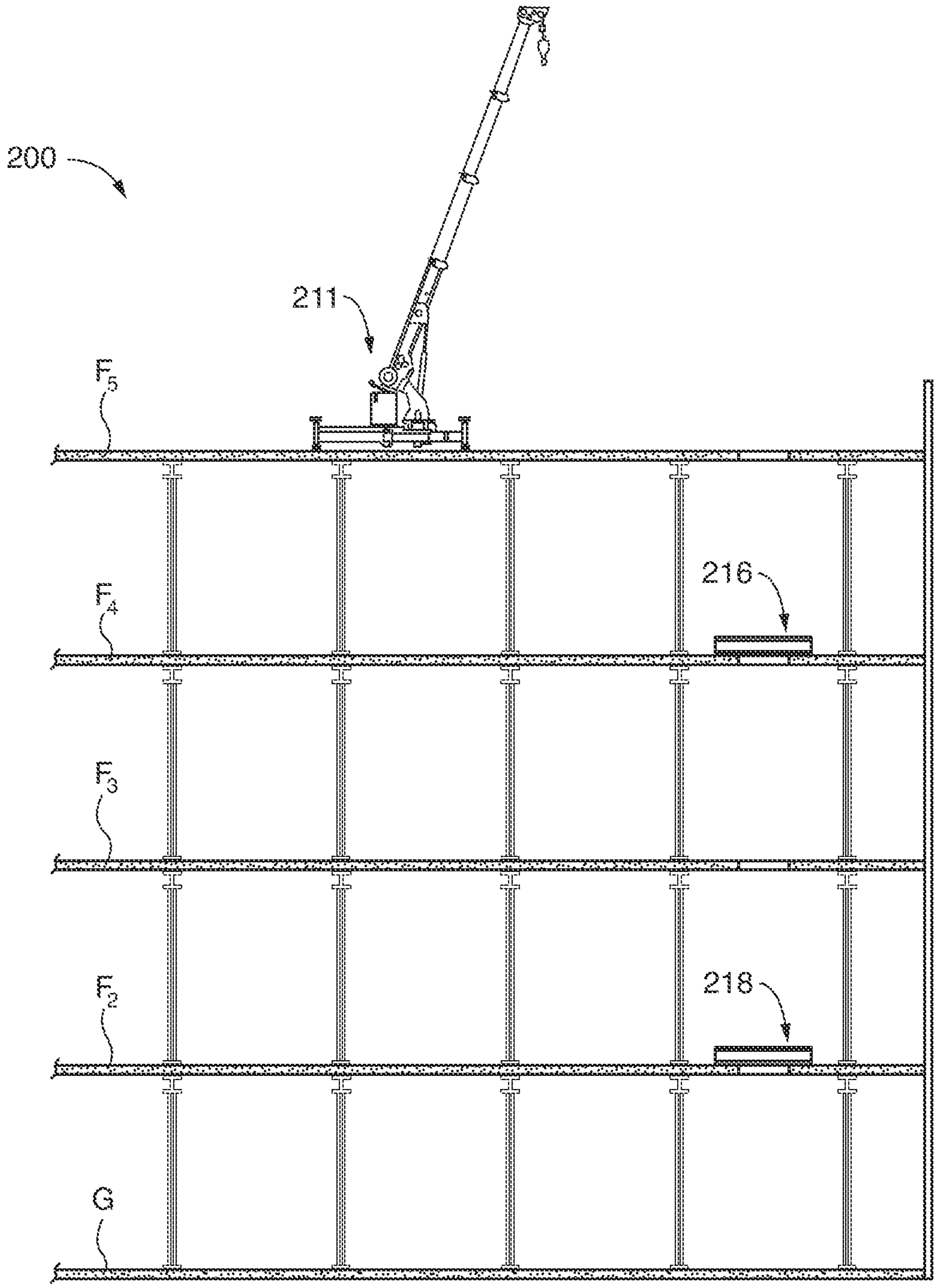
FIG. 2A shows a side view of a configuration after a subsequent step of installing support collars.
Figure 2B:
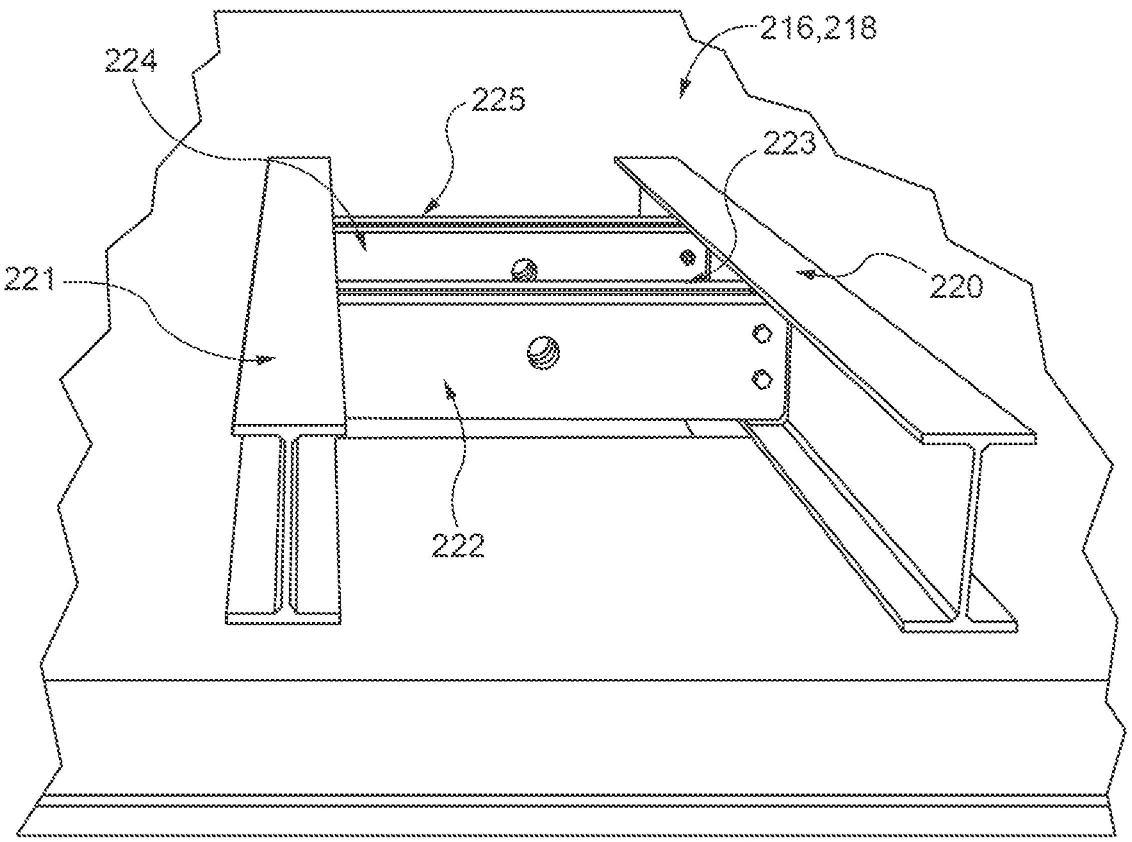
FIG. 2B shows a detail of the support collars.

FIG. 2A shows a side view of a configuration 200 after a subsequent step of installing collars, indicated as 216 and 218. Any mini crane such as a Herkules™ RK22-215 NYC Crawler Portable Crane is positioned on the topmost initial floor F5. The crane (211) may be hoisted to floor F5 assembled. In some embodiments, the crane (211) may be hoisted to floor F5 in components that are assembled on floor F5. FIG. 2B shows collars (216 and 218) formed from two forged I-beams or built-up plates configured as an I-beam 220 and 221 located parallel to one another and connected with four channel pieces (222, 223, 224, 225) to form a square or rectangular steel shape that sits on the floors slab around the perimeter of the floor cutouts (102, 104, 106 and 108). FIG. 2B. In some embodiments, support collars may be installed on each of the initial floors. Embodiments can include installing a support collar on a first floor of the set of initial floors (F2). Embodiments can include installing a second support collar on a third floor of the set of initial floors (F4). In some embodiments, a support collar is installed on each of the initial floors. In embodiments, the support collars are comprised of steel.

Figure 3A:
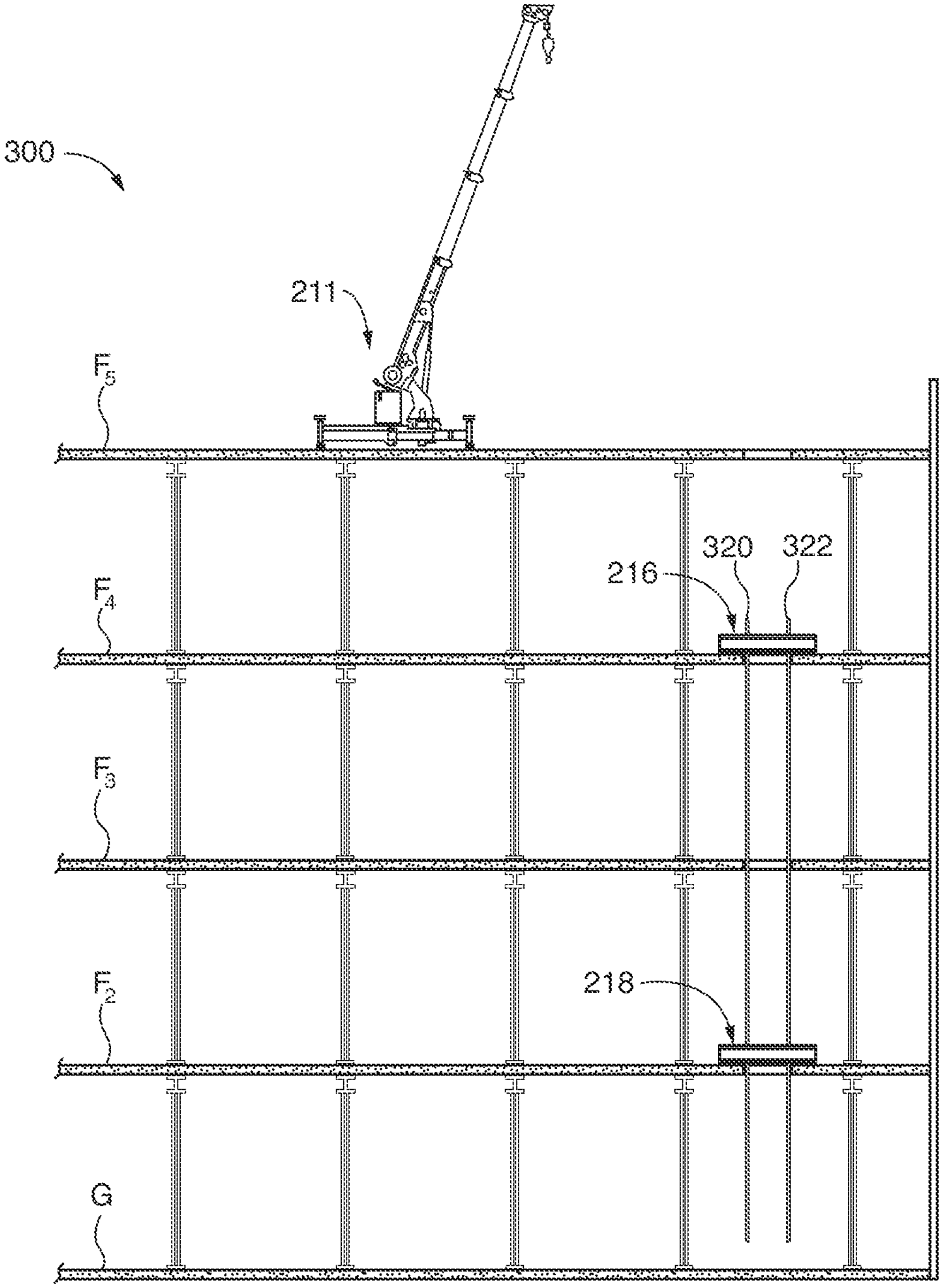
FIG. 3A shows a side view of a configuration after a subsequent step of installing lift ladders.
Figure 3B:
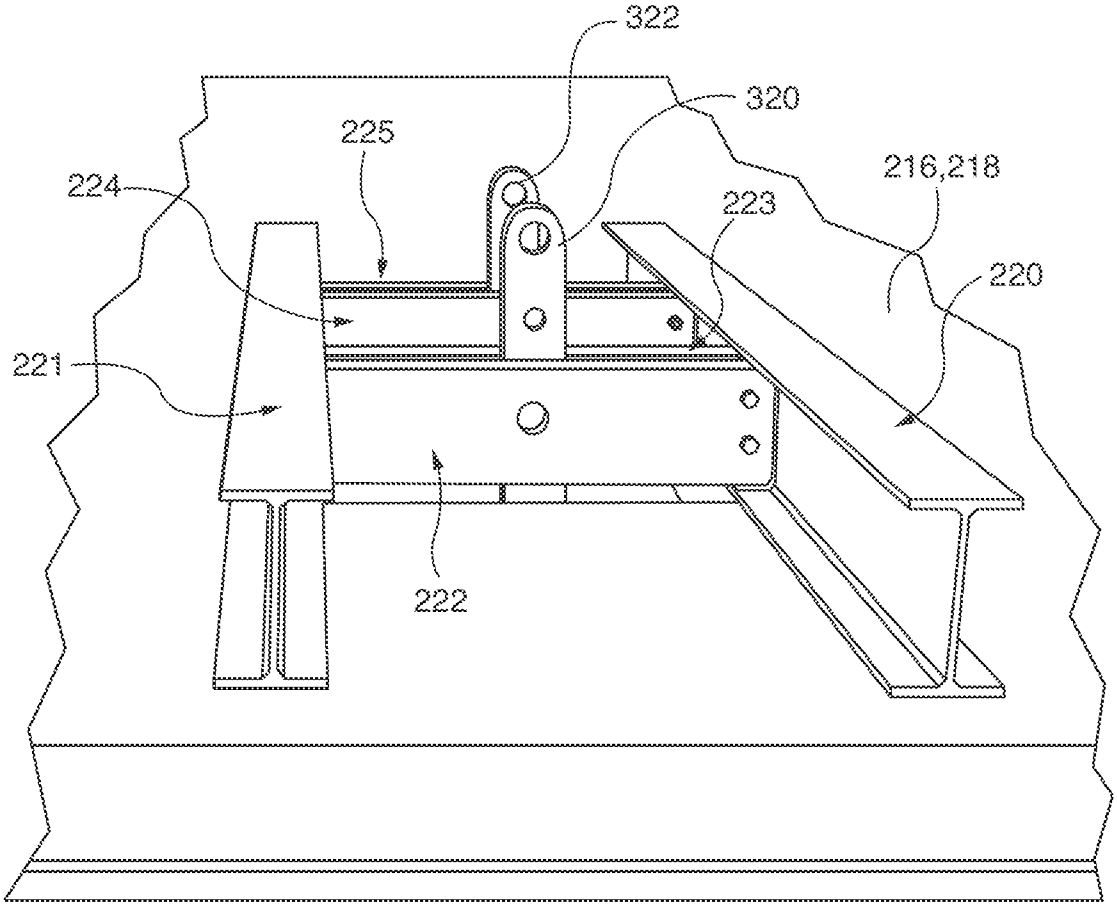
FIG. 3B shows a detail of the support collars with lift ladders installed.

FIG. 3A shows a side view of a configuration 300 after a subsequent step of installing lift ladders, indicated as 320 and 322 (FIG. 3B). FIG. 3B shows a perspective view of the upper portion of FIG. 3A. The lift ladders 320, 322 mechanically engage with the collars 216 and 218 via inserting the lift ladders between the paired channel members (222, 223 and 224, 225) on each side of the collar and pinning the lift track to each side of the collar between the paired channel members (216 and 218). FIG. 3B. In embodiments, the lift ladders are comprised of steel.

Figure 3C:
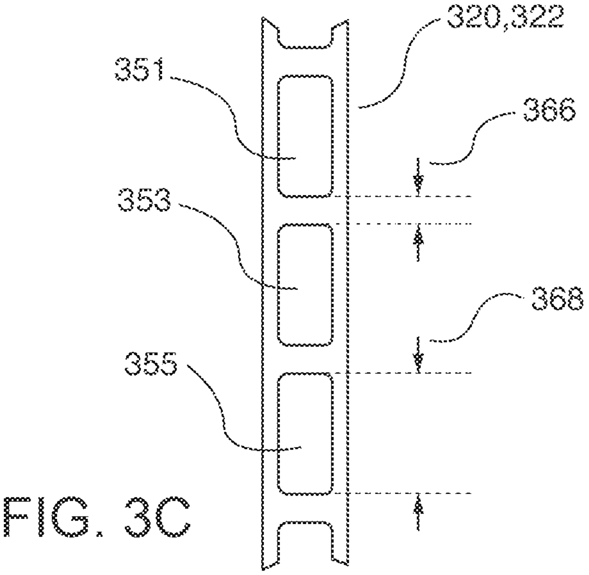
FIG. 3C shows additional detail of a lift track.

FIG. 3C depicts a portion of a lift track (216, 218). FIG. 3C shows additional detail of the lift ladders 320 and 322. As can be seen in this view, a plurality of openings, shown as 351, 353, and 357 allows for engagement with a climbing hydraulic piston system. In embodiments, the lift ladders can have a length ranging from (5) five meters to (30) thirty meters and can include openings such as 351 spaced apart by a spacing 366. Each opening has a length, indicated at 368.

Figure 4A:
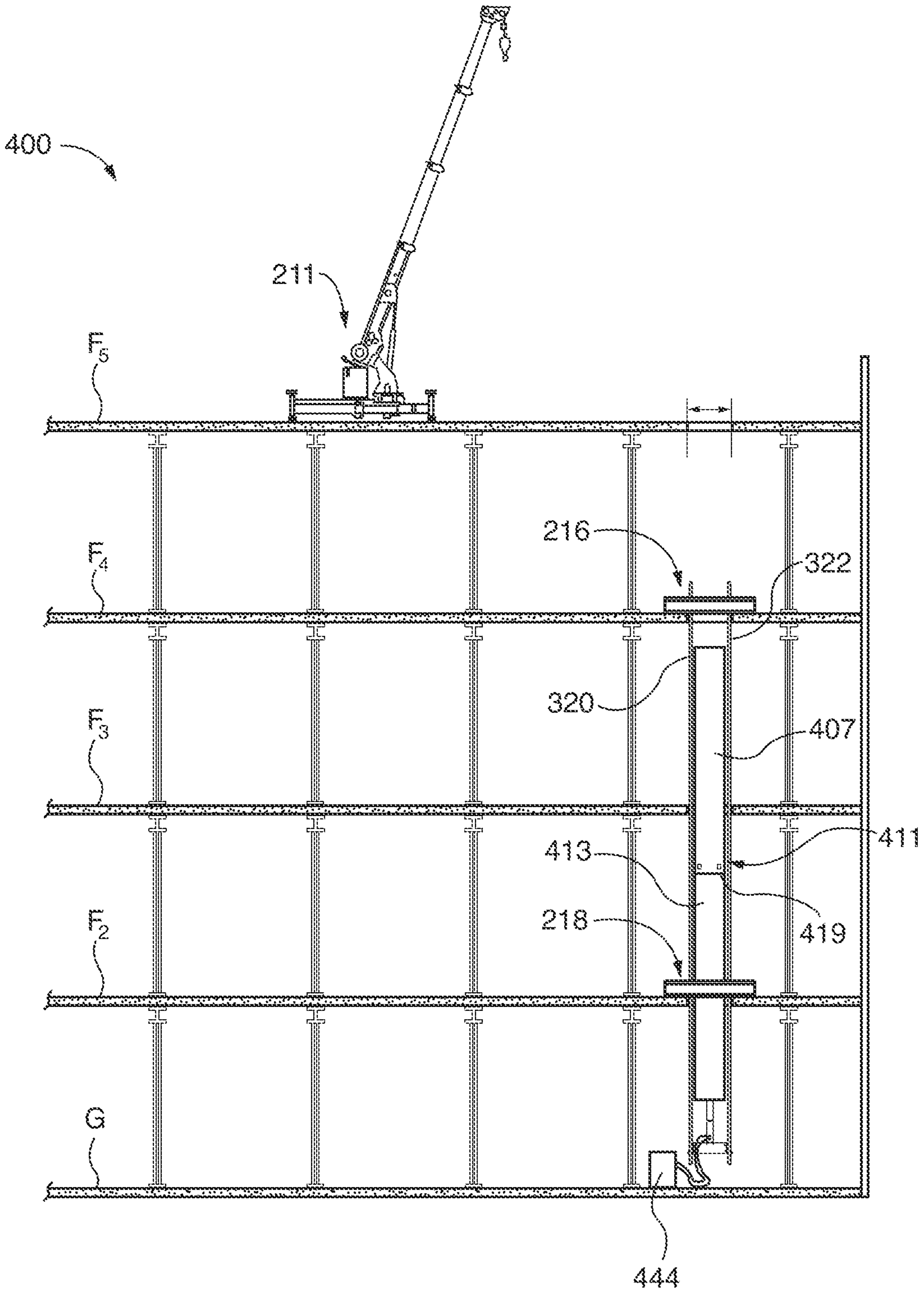
FIG. 4A shows a side view of a configuration after subsequent steps including installing tower portions and the hydraulic piston and locking base.

FIG. 4A shows a side view of a configuration 400 after subsequent steps including installing a two-part tower 411 made up of an upper (407) and lower (413) portion of the climbing hydraulic piston system. In embodiments, as indicated in FIG. 4A, the tower (411) can include a two-part square tower comprising an upper tower section 407 and lower tower section 413, coupled to each other at junction 419. In embodiments, the upper tower section 407 is bolted to the lower tower section 413 at junction 419. The two-part design of disclosed embodiments accelerates the removal of the apparatus when construction is complete because it allows the tower components to be easily lifted by the crane located on the building top floor and lowered to the ground when construction is complete, such as through an opening in the roof of the building. Once the apparatus is removed, the roof opening can be sealed with a door/hatch, or permanently sealed.

Figure 4B:
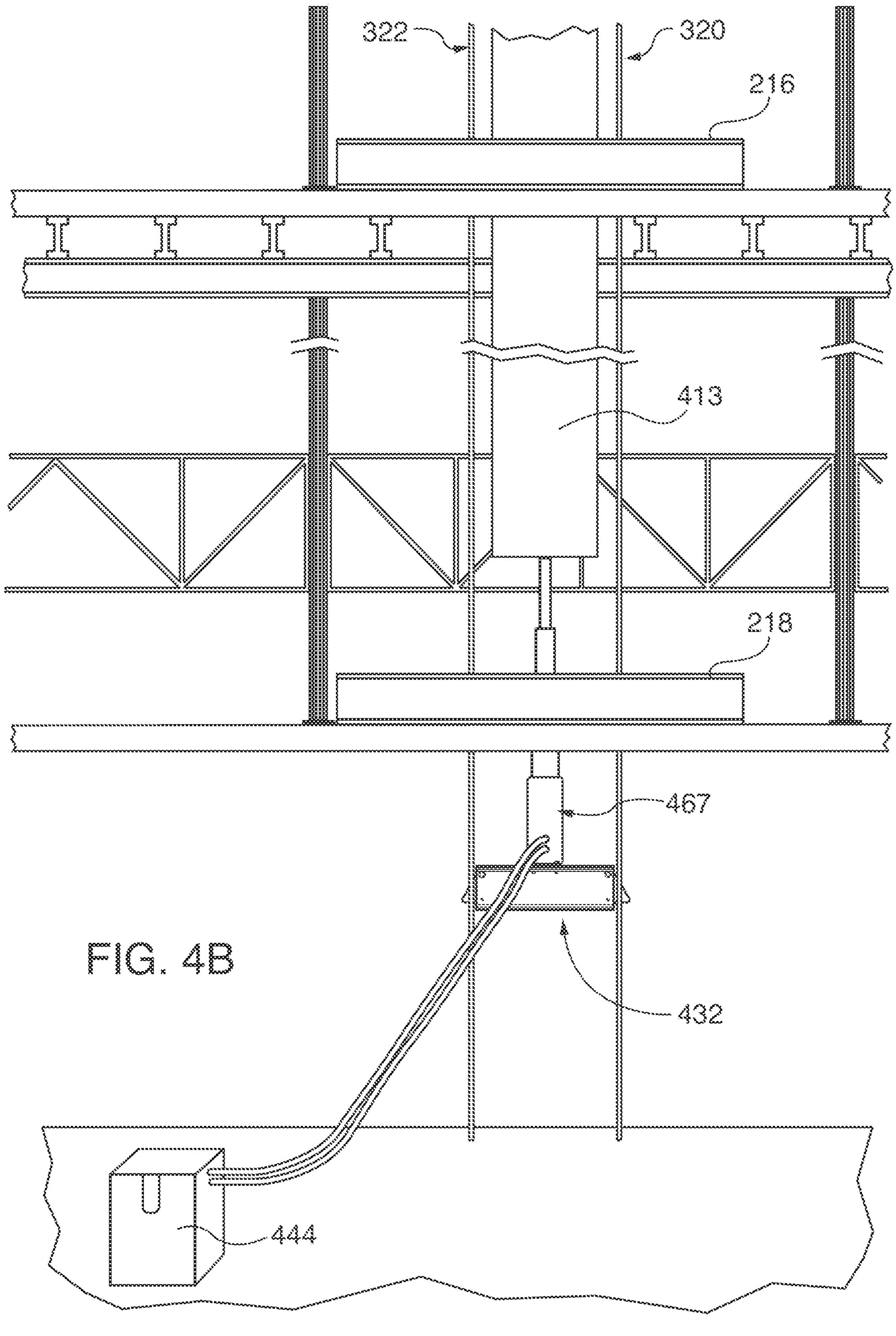
FIG. 4B. shows an exploded view of the side view presented in FIG. 4A.

A hydraulic power source 444 is added in proximity to the hydraulic piston system 467 in order to operate the hydraulic piston system (467). Hydraulic lines are connected to the hydraulic power source (444) along with valves and other controls for operation of the hydraulic piston system (467) to cause it to extend and retract as needed. FIG. 4B shows additional details of the lower portion of the hydraulic piston system (467) identifying the locking base (432) on which the hydraulic piston system sits (467).

Figure 4D:
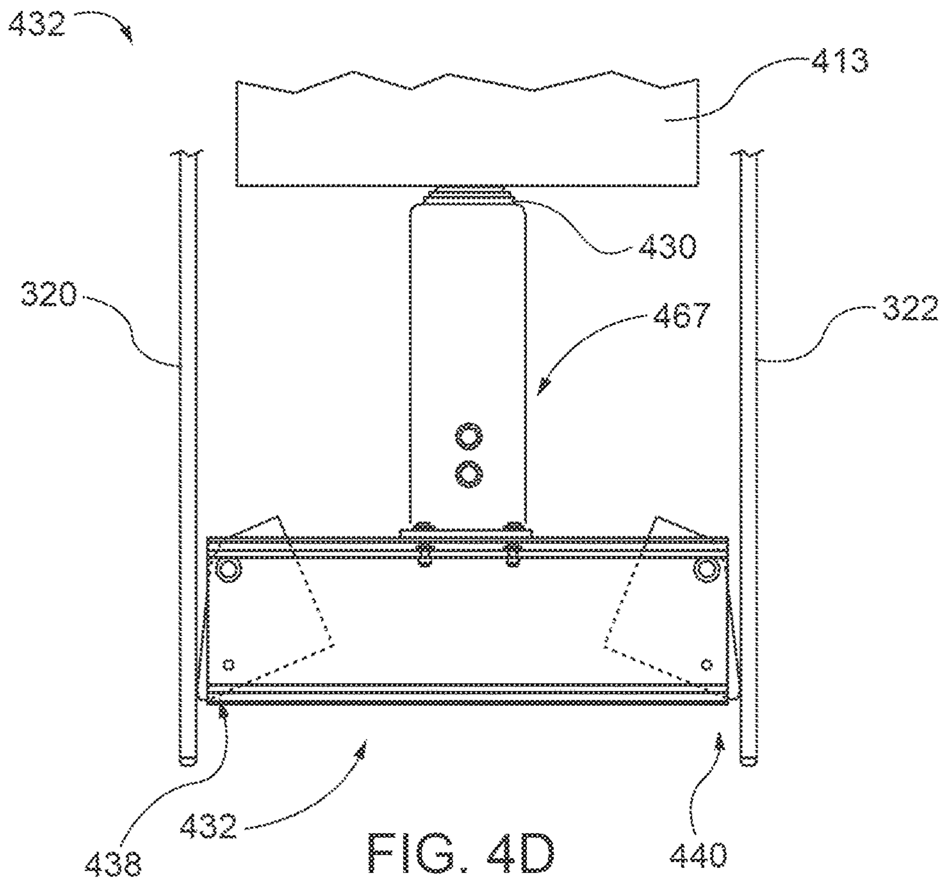
FIG. 4D shows additional details of the lower portion of the climbing hydraulic piston system.
Figure 4C:
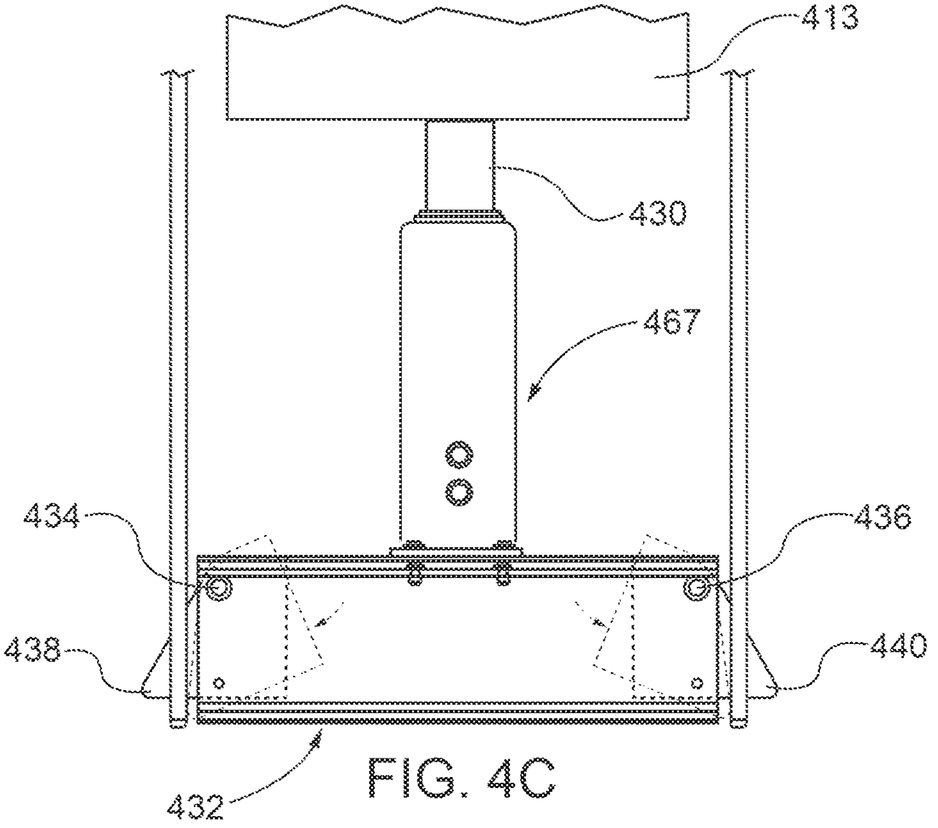
FIG. 4C shows additional details of the lower portion of the climbing hydraulic piston system.

Referring now to FIG. 4C, details of locking base (432) are shown, that includes tabs (438 and 440), as well as hydraulic piston system 467. The hydraulic piston system (467) contains a piston 430 which is energized or moved in both directions to cause the tower components (411 and 413) to move in a vertical direction up or down. The tabs (or dogs) 438 and 440 engage with the lift ladders 320 and 322 via openings in the lift ladders (351, 353, 355 of FIG. 3C). The tab 438 pivots at point 434 and tab 440 pivots at point 436. The tabs (438 and 440) are biased outward by their weight distribution which provides for the tabs to be moveably biased such that the tabs alternate between retracting in and protruding out as the hydraulic piston system (467) is retracted upward once the piston (430) has reached full extension. Specifically, the tabs (438 and 440) based on their geometry click into and through the openings (351, 353 and 355) of the lift ladders (320, 322) as the hydraulic piston system (467) is pulled upward after full extension of the piston (430). In contrast, when the tabs come to rest, they are biased out (locked out) and are seated at the bottom of the openings (351, 353 and 355) in the lift ladders (320, 322) to provide a stable platform for the locking base (432). At this point, the piston (430) extends from the hydraulic piston system (467) coupled to the locking base (432). In embodiments, the locking base (432), including the tabs (438 and 440), are comprised of steel.

Referring now to FIG. 4D the locking base 432 is shown in a lift rail adjustment configuration. In this configuration, tabs 438 and 440 are being pushed in as the locking base is translated up toward the base of the tower (413) after full extension of the piston (430) has been reached. The tabs (438, 440) are naturally biased outward and that allows for them to freely translate up and through the openings (351, 353 and 355) of the lift ladders (320, 322) as the hydraulic piston system (467) mounted to the locking base (432) translates upward.

Figure 4E:
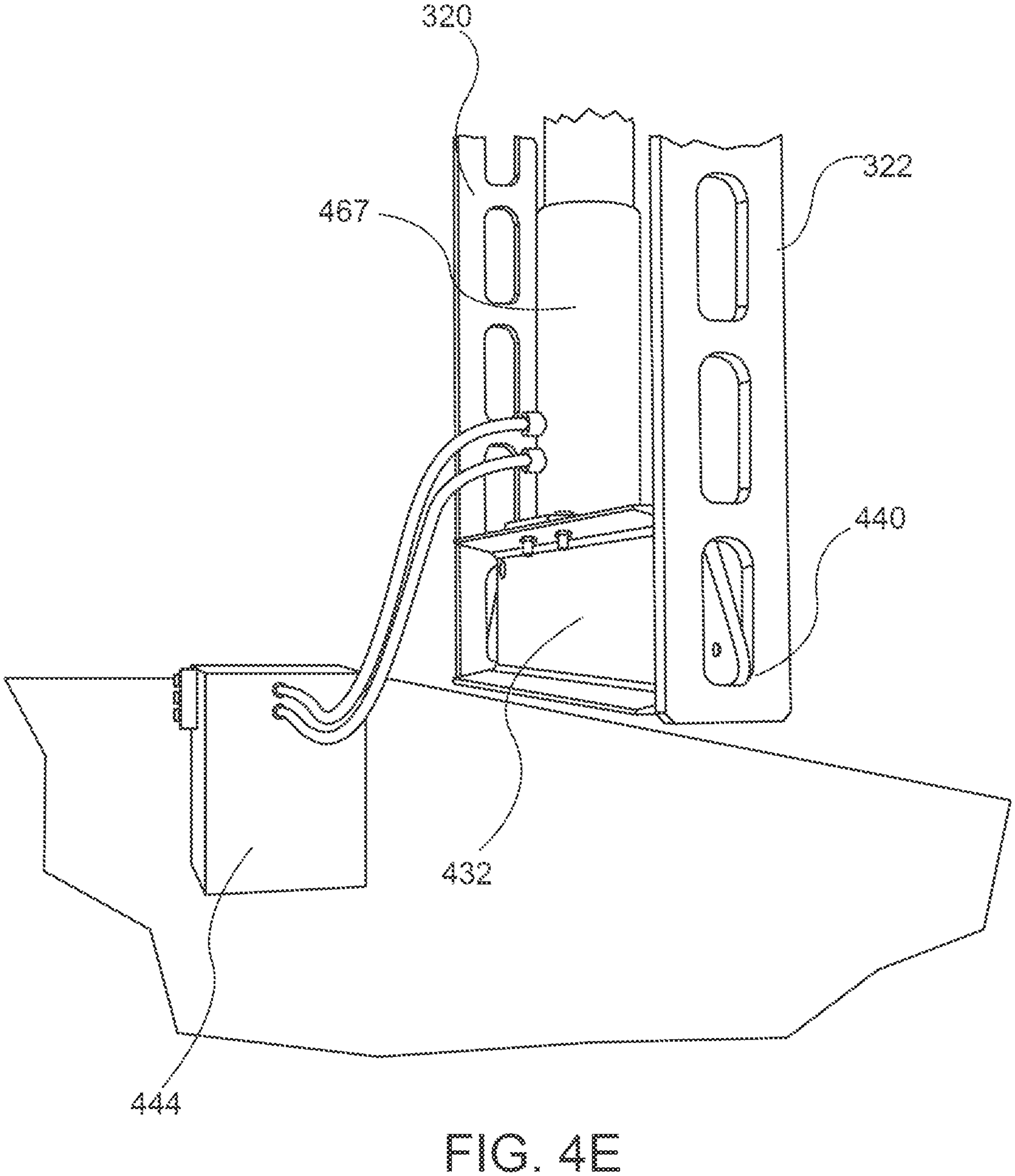
FIG. 4E shows a perspective view of the lower portion of the climbing hydraulic piston system.

FIG. 4E shows a perspective view of the locking base 432 further detailing the hydraulic piston system connection and the engagement of the locking base (432) to the lift ladders 320, 322 by means of the tabs 438 and 440 biased out to engage with openings 351, 353, and 357 in the lift ladders 320, 322.

Figure 5:
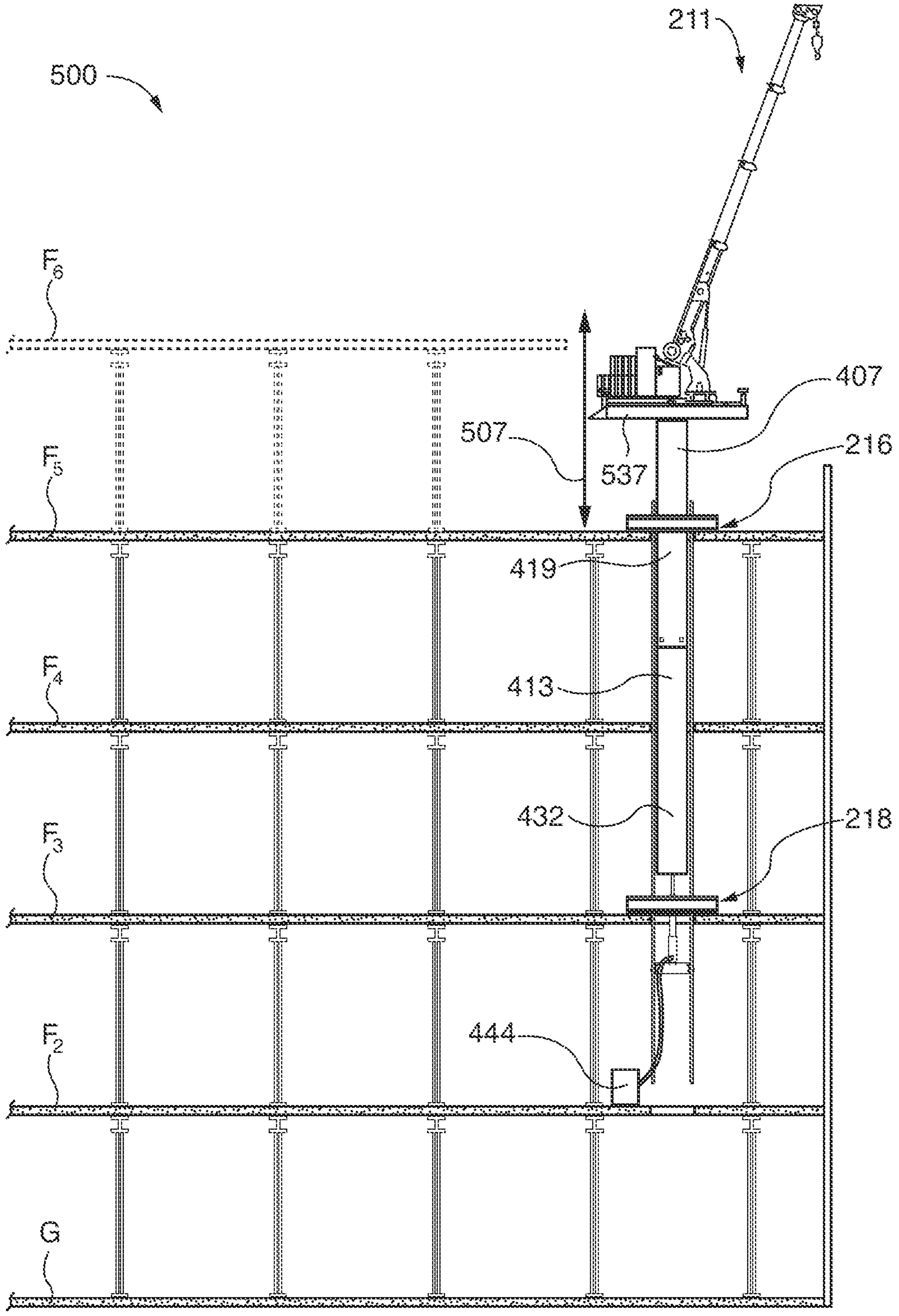
FIG. 5 shows a side view of a configuration after subsequent steps including installing an upper and lower tower portion of the climbing hydraulic piston system and lifting a crane from one floor to another.

FIG. 5 shows a configuration 500 that includes a crane (211) positioned on a ramp 537 on top of the upper portion of the climbing hydraulic piston system after a subsequent step of elevating the crane. In some embodiments, in a single iteration, the crane is lifted to a height such that the ramp (537) for the crane (211) exceeds a level of a subsequent floor, indicated as 507. In some embodiments, multiple climbing cycles may be used to lift the crane (211) to a height (507) that exceeds a level of a subsequent floor, indicated as F6. With the crane lifted as shown in FIG. 5, the frame and concrete for the subsequent floor F6 can be erected and poured. A cutout is framed in the subsequent floor (F6) to accommodate the upper portion (419) of the tower of the climbing hydraulic piston system. In embodiments, the cutout is a little larger than a cross-section taken up by the crane. In one or more embodiments, the cutout size ranges from five to ten percent larger than the cross-section taken up by the crane.

In embodiments, the crane (211) is lifted at a height 507 above the topmost floor F6 while the concrete is poured to form F6. In this embodiment, a channel section (111) is left out of the F6 concrete pour to allow for the tower system (407) to operate through floor F6. Here, once F6 is poured with the leave out channel section (111), then the crane (211) on the ramp (537) elevated on the tower (407) above F6 is lowered onto F6 and the crane (211) driven off of the ramp (537) onto F6 to perform its functions on that floor.

In alterative embodiments, a large leave out is constructed in floor F6 to allow for multiple cranes (211) and other equipment to be lifted to F6. The leave out is large enough to allow for the ramp (537) with a crane (211) or other equipment located thereon to pass through the leave out. The leave out is, however, small enough to allow for planking to be installed between F6 and the ramp (537) when the ramp is approximately flush with the balance of the poured floor on F6 to allow for the cranes and other equipment on the ramp to move from the ramp (537) to F6. Once all of the cranes and equipment on F5 are moved to F6, then the leave out to is filled in such that the channel section (111) is remaining out of the concrete pour of F6 only.

Figure 6A:
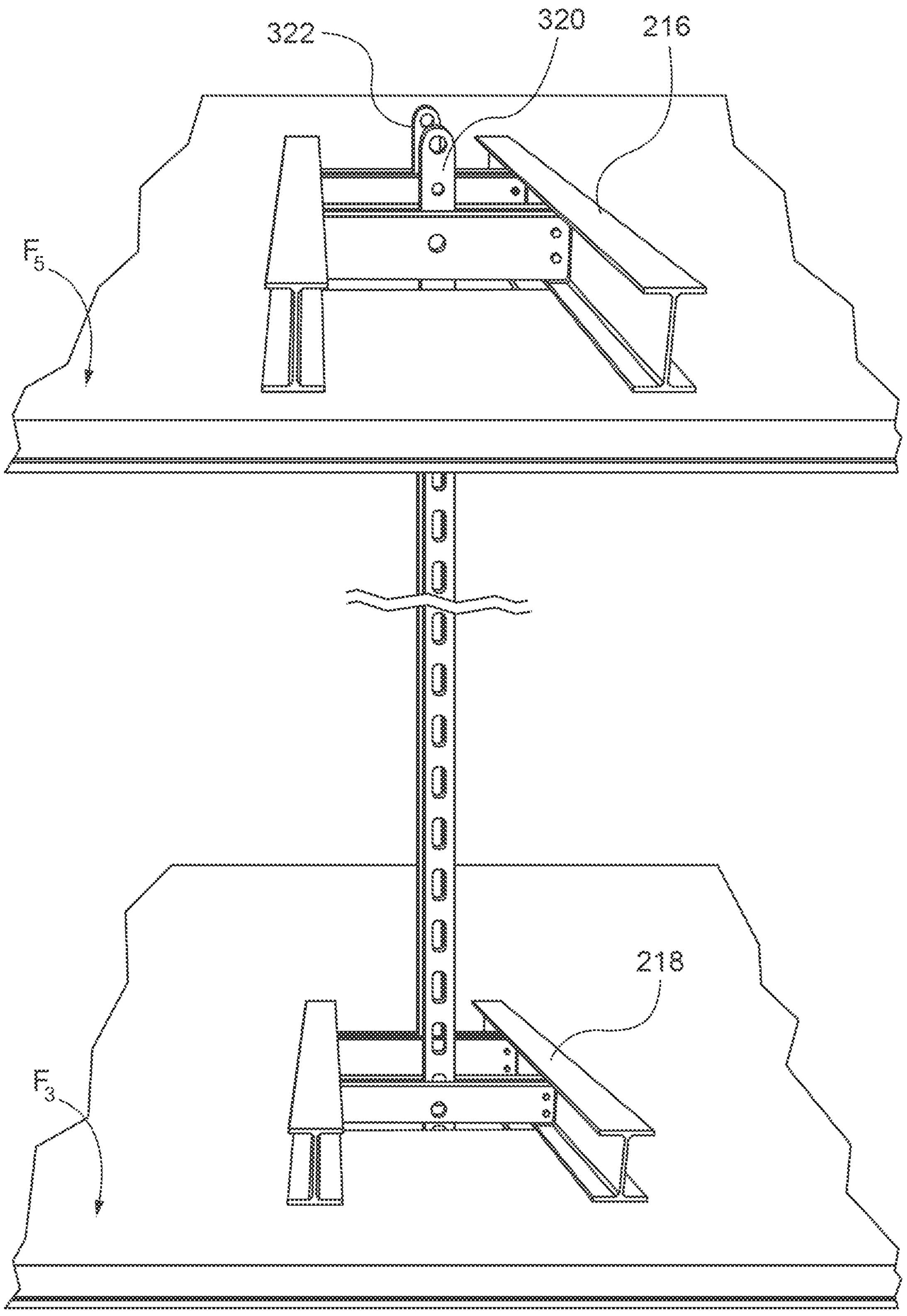
FIG. 6A shows a front view of the climbing hydraulic piston system with the lift ladders and without the upper and lower tower portions.
Figure 6B:
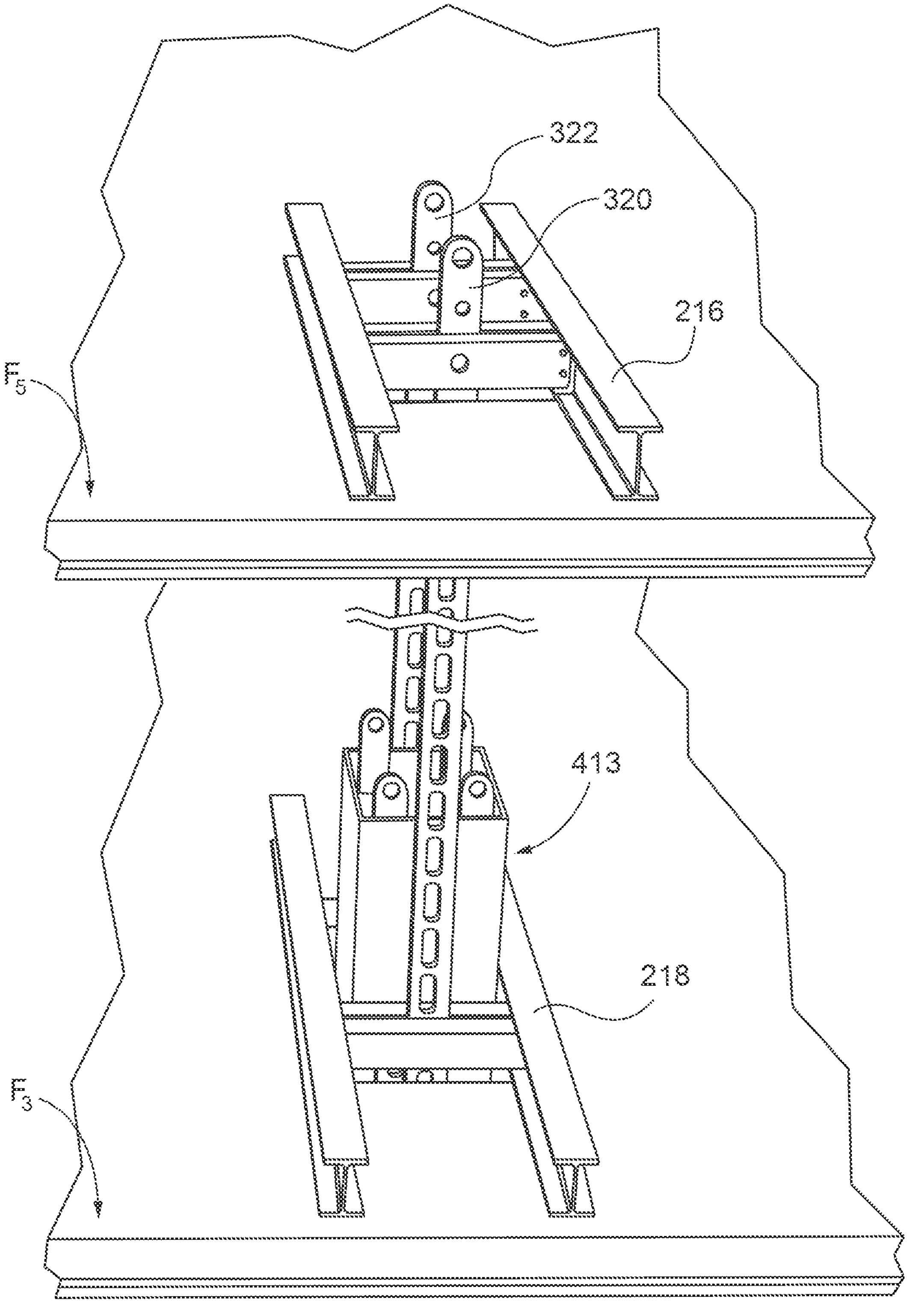
FIG. 6B shows a front view of the climbing hydraulic piston system with lift ladders and just the lower tower portion installed.
Figure 6C:
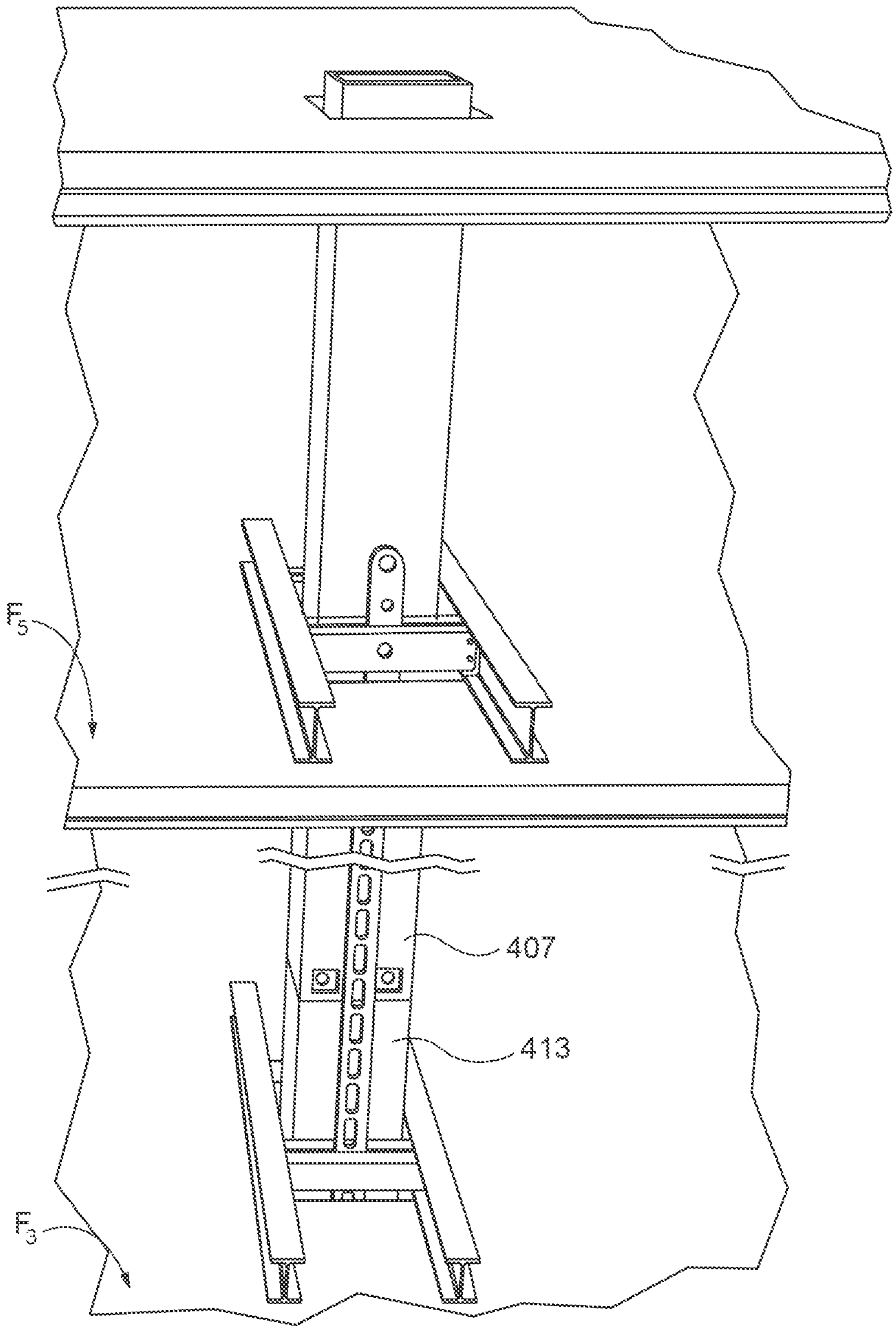
FIG. 6C shows a front view of the climbing hydraulic piston system with lift ladders and upper and lower tower portions installed.
Figure 6D:
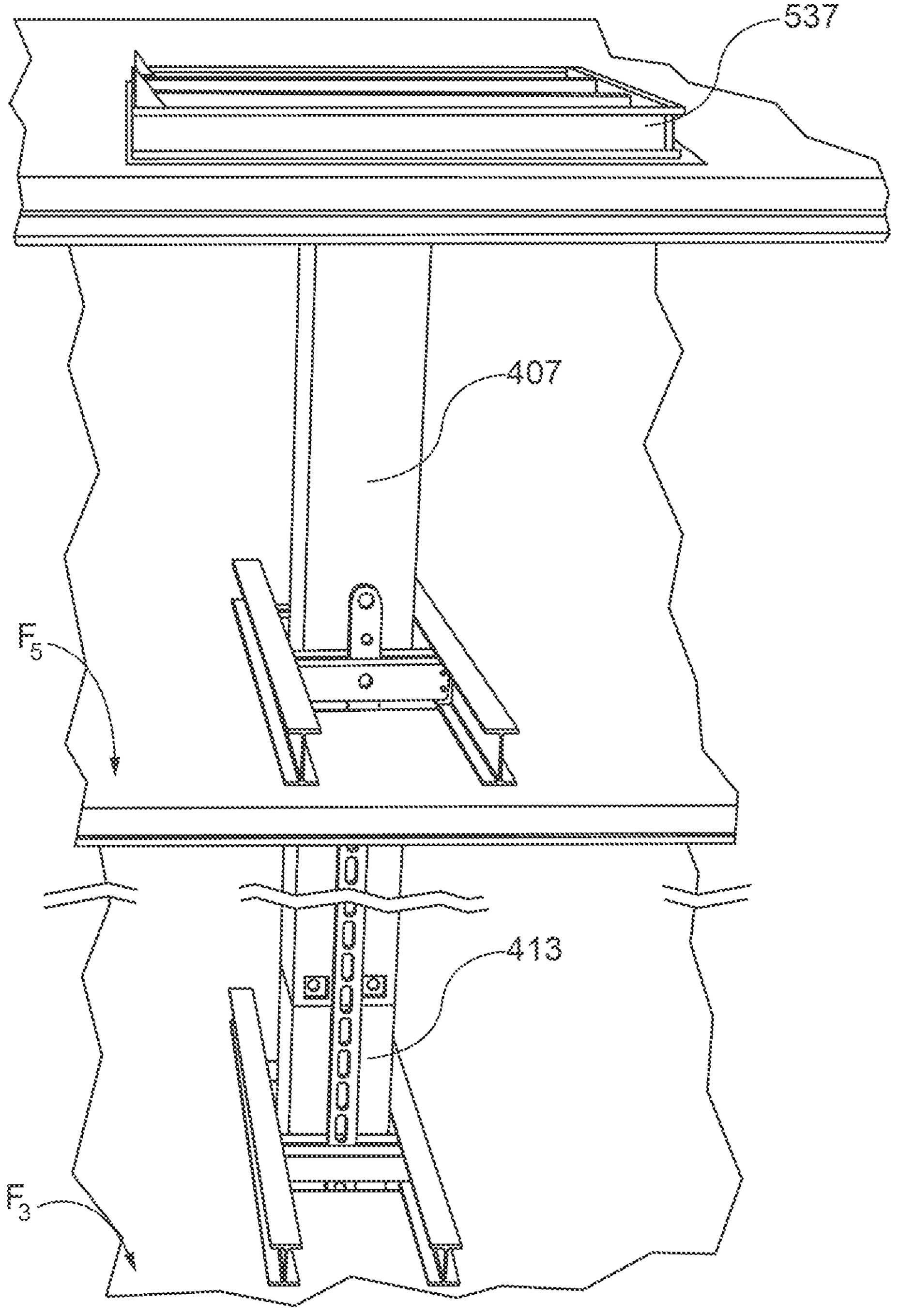
FIG. 6D shows a front view of the climbing hydraulic piston system with lift ladders and upper and lower tower portions installed and a ramp on the top floor where a crawler crane will sit.

FIG. 6A shows a front view close up of the lift ladders 320 and 322 locked into the upper (216) and lower (218) collar assemblies on floors F5 and F3, respectively. FIG. 6B shows the insertion of the lower tower section (413) riding in the multi-floor channel identified as 111. FIG. 6C shows the addition of the upper tower section (407) connecting with the lower tower section (413) and riding in the multi-floor channel identified as 111. FIG. 6D shows the assembled configuration of FIG. 6C with the additional element of a floor above F5 with a crane ramp (537) affixed to the upper portion of the upper tower section (407).

Figure 7A:
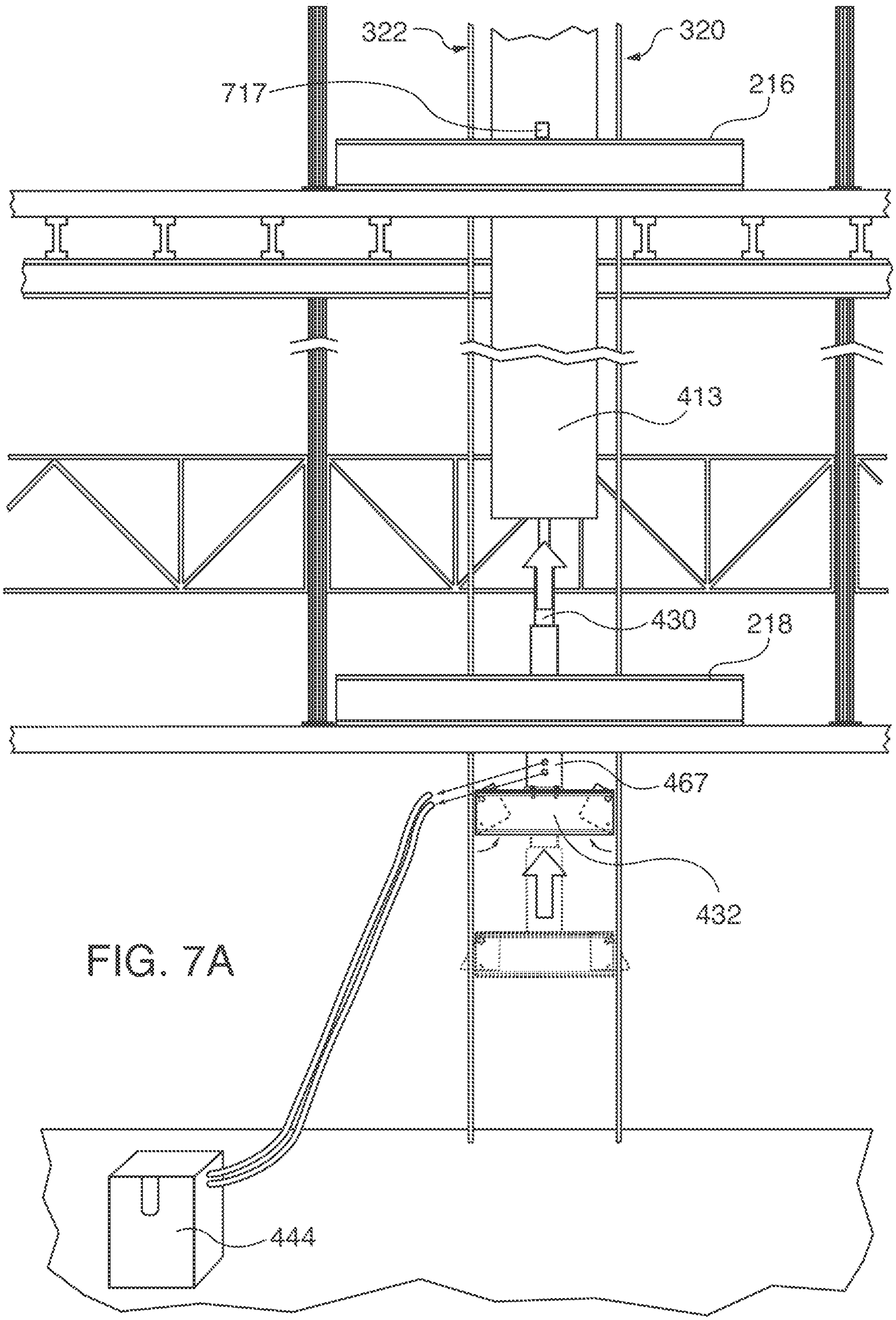
FIG. 7A shows a side view of a configuration where the locking base is elevated up the lift ladders by the hydraulic piston system.
Figure 7B:
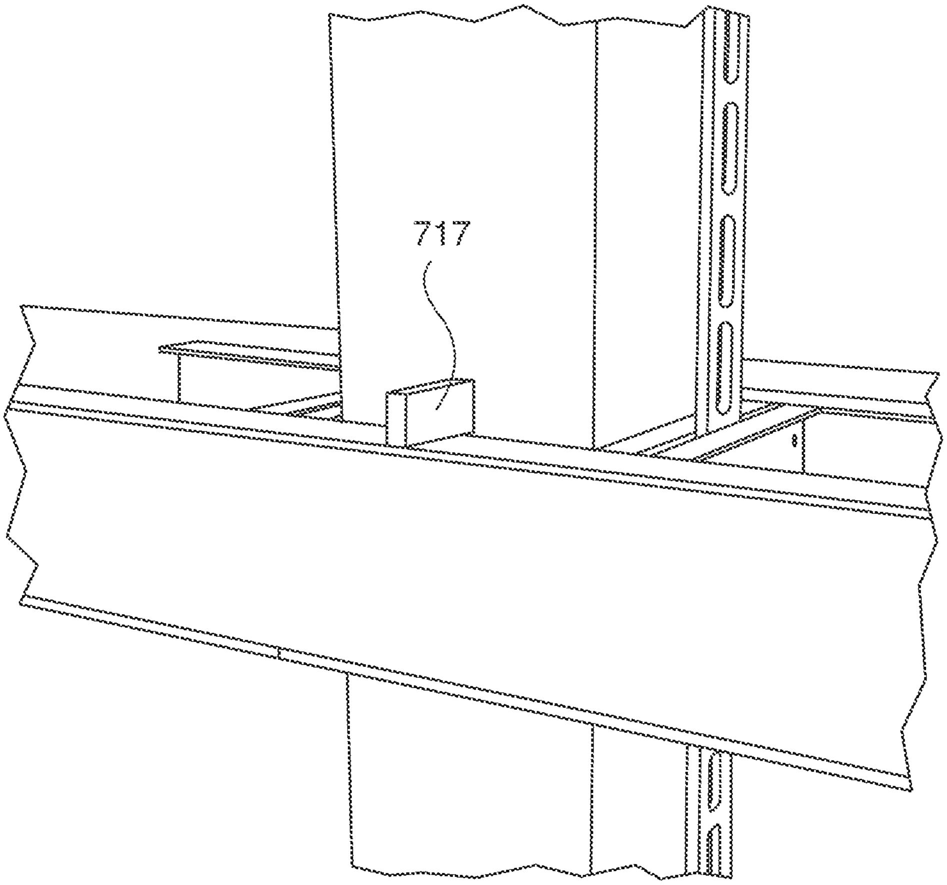
FIG. 7B shows an isometric drawing of the bar securing the tower system to a collar while the locking base is elevated up the lift ladders by the hydraulic piston system.

FIG. 7A shows a side view configuration after subsequent steps including raising the locking base 432 (as compared with the prior position of 432 shown in dashed lines). In the embodiments disclosed in FIG. 7A, one or more rods, indicated as 717, may be inserted through the tower resting on the collars (216, 218) and also traversing the tower component 411, thereby locking the vertical position of the tower. The tower may first be secured by inserting rods through the tower (411) resting on the collars (216, 218) to vertically stabilize the tower during the moving and repositioning of the lift ladders (320, 322) and the locking base (432). Thus, embodiments can include securing the tower (411) to collar (216, 218) by means of rods (717) inserted through the tower sections, such as shown with 717 of FIG. 7B, raising the locking base (432) by reversing the hydraulic motor (444) in the hydraulic piston system (467) which lifts the locking base up toward the lower tower (413) section. In this movement, the tabs (438 and 440) click up through the openings (351, 353 and 355) in the lift ladders (320, 322) until the piston (430) in the hydraulic piston system (467) attached to the locking base (432) runs out of travel. The raising of the locking base (432) is accomplished by energizing the piston system (467) so that it pulls the locking base (432) up toward the bottom tower component (413) until the piston (430) in the in the hydraulic piston system (467) has fully recessed. Thus, in embodiments, the tower rides in the multi-floor channel and is advanced by the hydraulic piston system (467).

Figure 8A:
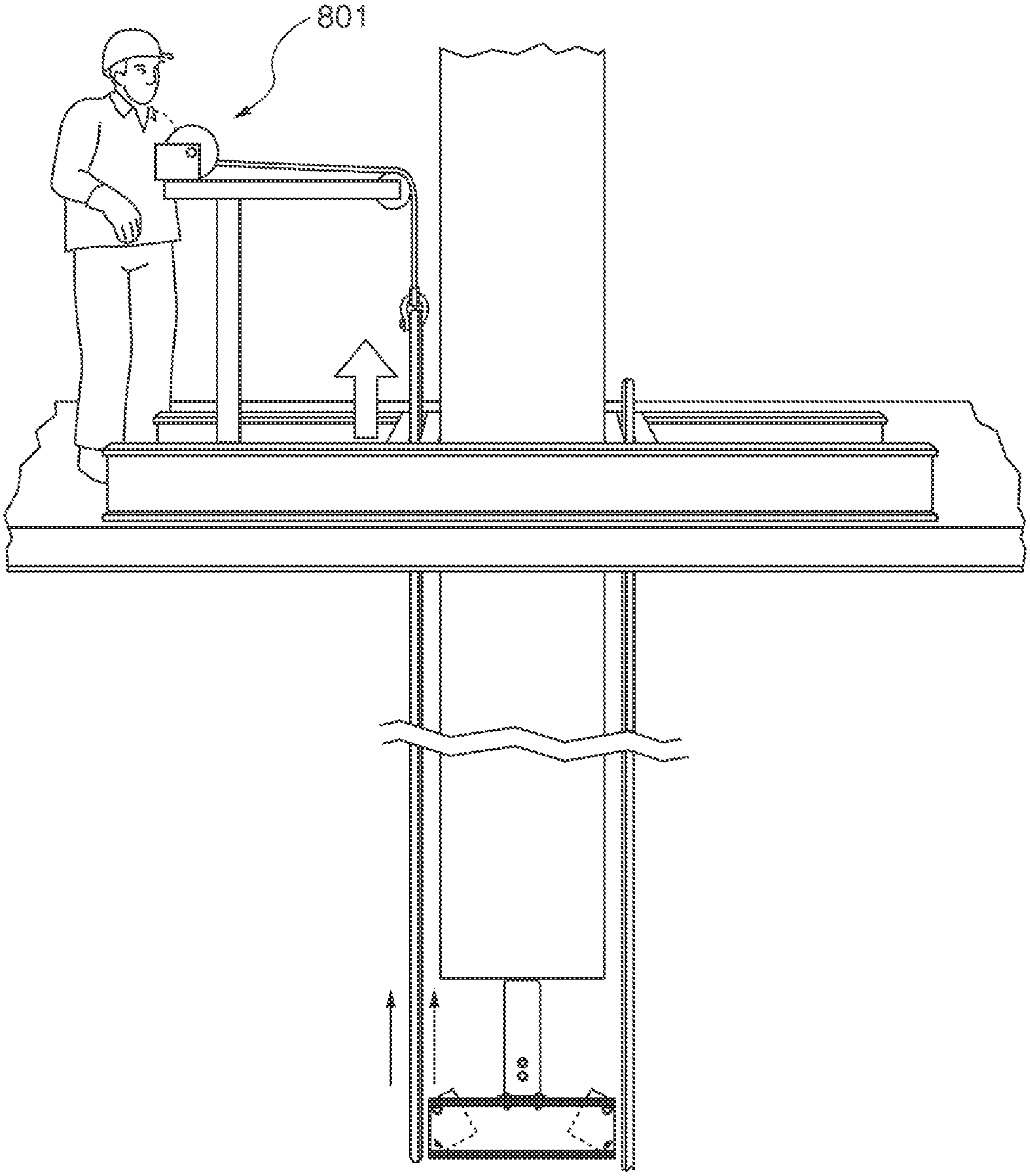
FIG. 8A shows a lift assist mechanism to elevate the lift ladders.
Figure 8B:
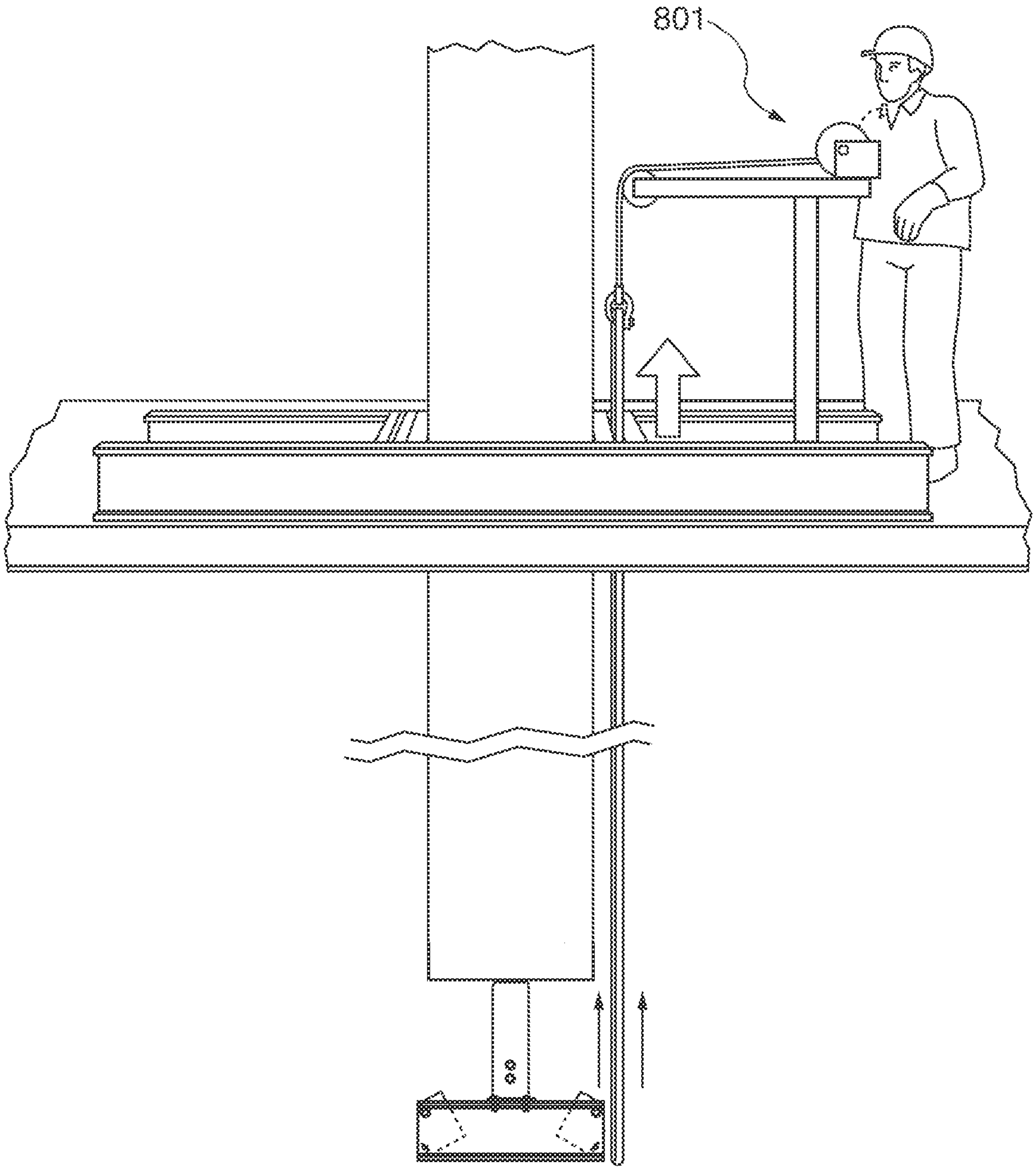
FIG. 8B shows a lift assist mechanism to elevate the lift ladders.

Thereafter, the locking base (432) is disengaged form the lift ladders (320, 322) by recessing the tabs (438, 440) on the locking base (432), the lift ladders are disengaged (unpinned in embodiments) from the collars (216, 218) and raised up the building by means of a winch 801. Specifically, FIG. 8A and FIG. 8B show a lift assist mechanism (801) in accordance with disclosed embodiments. Lift assist mechanism (801) can include a hand-powered winch that is affixed to a portion of the upper collar (216) shown in FIG. 4A. The lift assist mechanism (801) may be bolted onto the collar (216) in some embodiments. The lift assist mechanism (801) may be used to hoist up lift ladders (320, 322) as the construction progresses. As new floors are built, periodically the lift ladders (320, 322) are raised and installed at a new position and reattached to the collars (216 and 218) also raised to a new location, allowing the tower system to effectively "crawl up" the building to the new floors. In some embodiments, the lift assist mechanism (801) may be an electrically or hydraulically powered winch.

Figure 9:
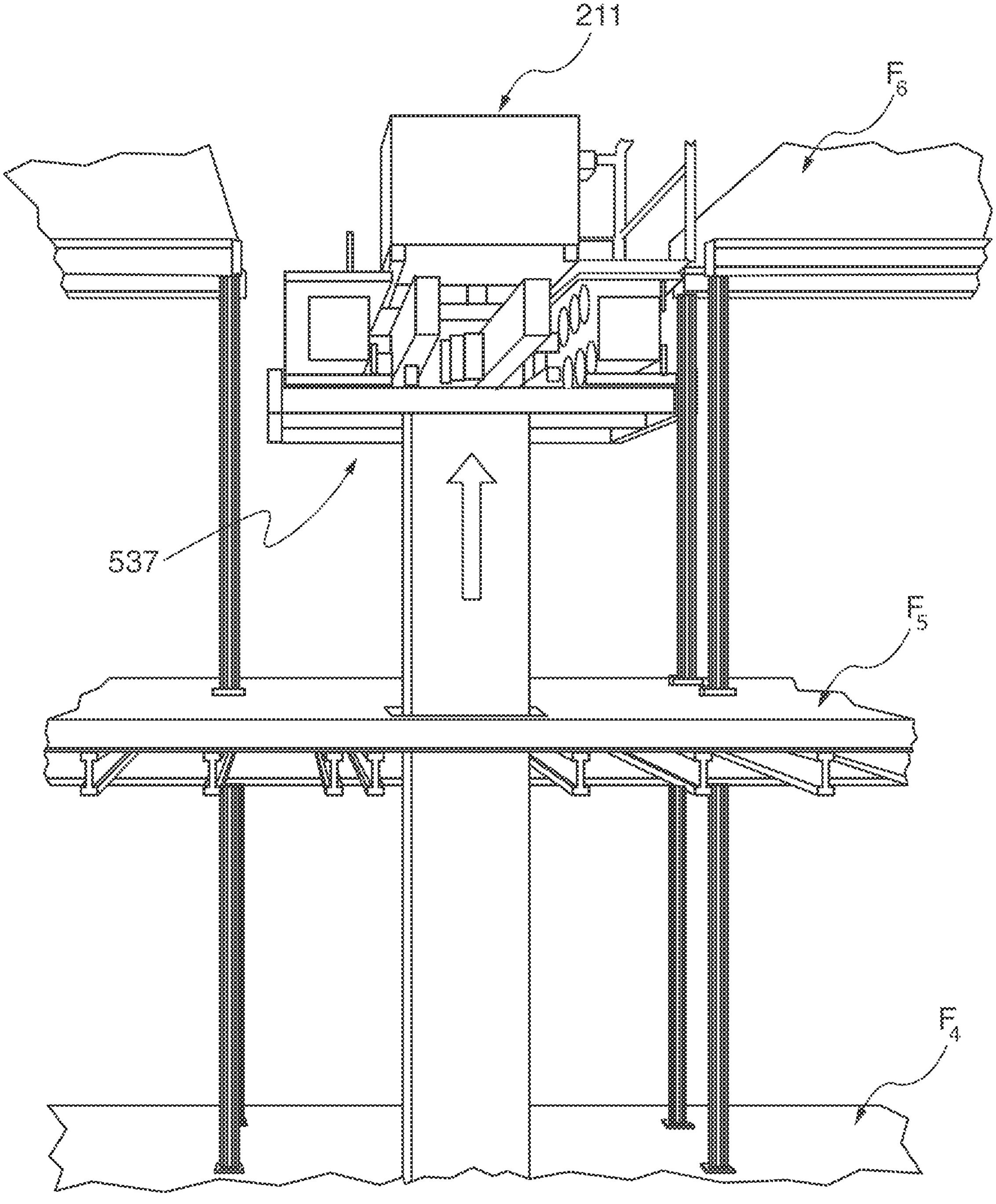
FIG. 9 shows a front view of a configuration after subsequent steps including raising the climbing hydraulic piston system with a crane on a ramp.

FIG. 9 shows a side view of the platform and crane after a subsequent step of partially building an additional floor, indicated as floor F6. In embodiments, A large cutout—or leave out—is framed in the floor to accommodate the ramp (537) and the crane (211). The slab-based crane (211) on floor F5 is placed over the hydraulic piston system (467) on ramp (537). The crane (211) is elevated such that the lower portion of the ramp (537) is flush with F6 and with the use of planking, the crane (211) is moved off the ramp (537) to operate on the floor to carry out construction activities. This process can be repeated to lift more cranes or other equipment from F5 to F6. Once all of the equipment is moved from F5 to F6, the tower (407) with the ramp (537) is lifted above F6 a sufficient height for the large leave out to be filled in such that the channel section (111) is remaining out of the concrete pour of F6 only. If there are additional levels to be built, the process is repeated. If the final level has been built, then the process terminates with construction of the floors of the building completed.

Figure 10:
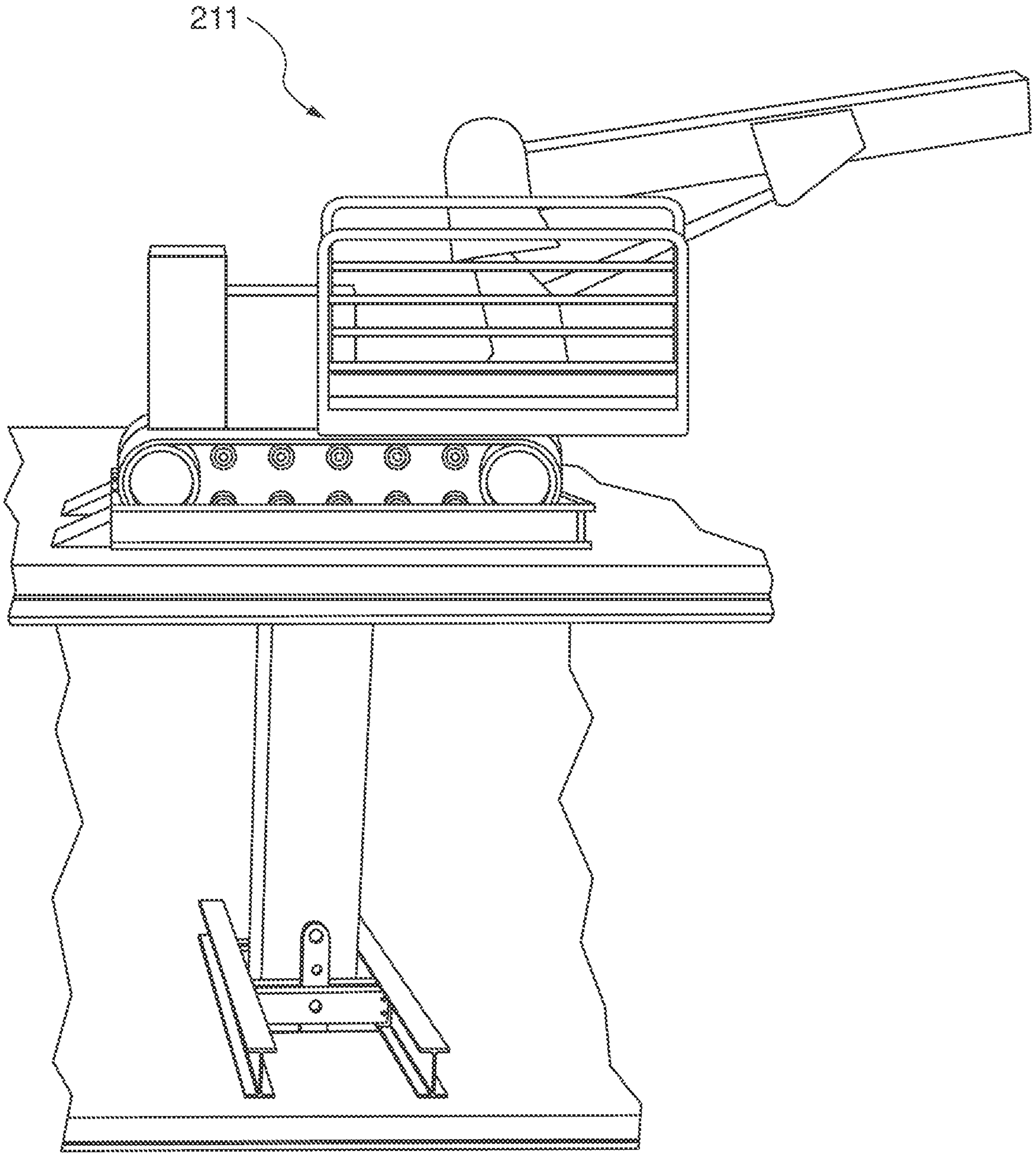
FIG. 10 shows a side view of a configuration after a subsequent step of building an additional floor and lowering a crane on a ramp onto that floor.
Figure 11:
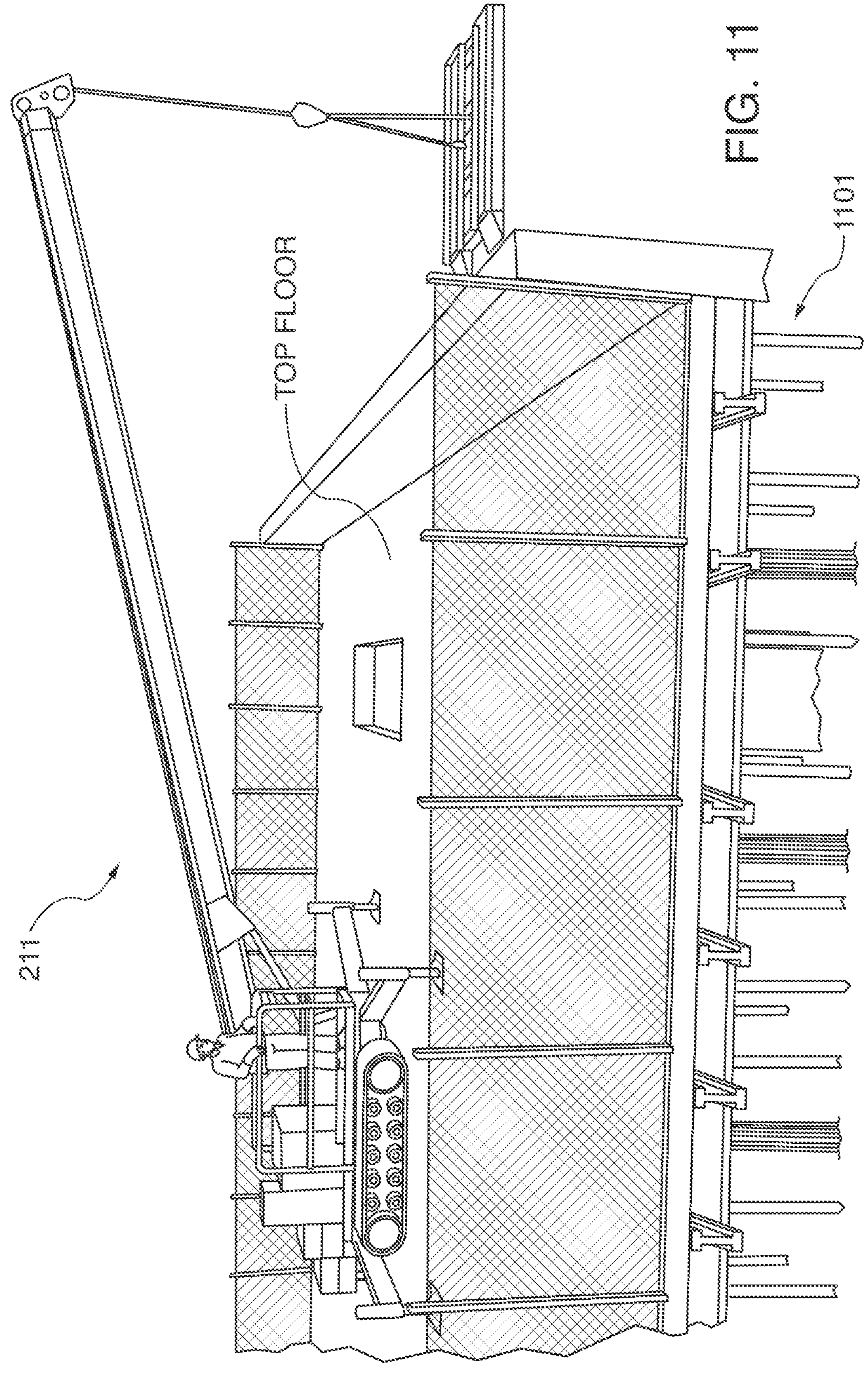
FIG. 11 shows a crane on a ramp lowered onto a subsequent floor performing construction operations with temporary supports on the floor below.

FIG. 10 shows a side view after a subsequent step of lowering the ramp (537) and crane (211) on the subsequent floor. This process can be repeated as needed to construct subsequent building levels (floors and/or roof). FIG. 11 shows temporary supports, shown generally as 1101, installed on one or more floors below the floor where the crane (211) is operating to distribute the load of the crane as it moves around the floor to perform construction duties. The temporary supports can be comprised of wood, metal, or other suitable construction material. Once building construction is complete and the crane ramp (537), collars (216, 218), lift ladders (320, 322), two-part tower system (407, 413), locking base (432) hydraulic piston system (467) and hydraulic power system (444) can be removed through the opening in the top floor of the structure and lowered to the ground the temporary supports (1101) can be removed. The mini crane can be disassembled and removed from the top floor through the carbo elevator.

Figure 12:
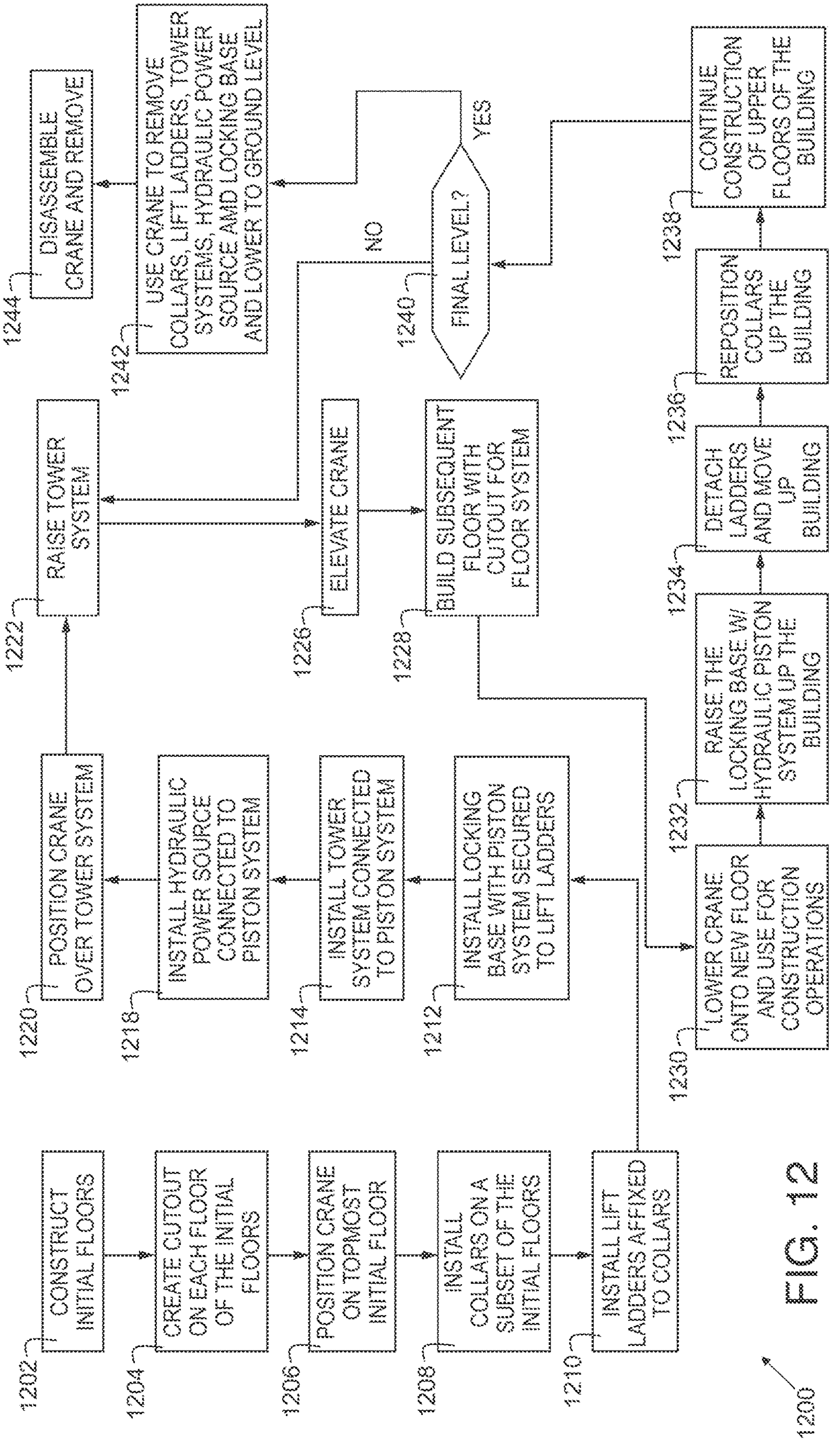
FIG. 12 is a flowchart showing process steps for embodiments of the present invention.

FIG. 12 is a flowchart 1200 showing process steps for embodiments of the present invention. At 1202, an initial set of floors is constructed. As shown in FIG. 1, the initial set of floors comprises floors F2, F3, F4, and F5. At 1204, a cutout is created on each floor of the initial floors. At 1206, a mini crane is positioned on the topmost initial floor. At 1208, collars are installed on a subset of the initial floors. At 1210, the lift ladders are installed. At 1212, the locking base with hydraulic piston system is secured to the lift ladders. At 1214, the two-part tower system is inserted into the area formed by the cut outs in the initial floors and connected to the hydraulic piston system. At 1218, the hydraulic power source is connected to the hydraulic piston system. At 1220, the mini crane is positioned above the tower system on the topmost initial floor. At 1222 and 1226, the hydraulic system is activated, and the tower lifts the mini crane above the next floor to be constructed. At 1228, the subsequent floor is constructed. At 1230, the mini crane is lowered onto the recently constructed floor and used for construction activities.

Once the position of the hydraulic piston system reaches full extension (i.e., has gone as high as it can go), at 1232, the locking base with hydraulic piston system is pulled upward along the lift ladders (crawls up the building floors) by activating the hydraulic piston system in reverse, so to speak. At 1234, the lift ladders are detached from the locking base and the collars and the lift ladders are moved upward and repositioned higher in the channel to allow construction of higher floors to continue. At 1236, the collars are positioned to upper floors and construction of the building continues. At 1242, the building construction is completed and the crane on the top floor extracts from the channel the collars, lift ladders, tower system, hydraulic power source and locking base and removes it to the ground. The crane is dismantled and removed via the freight elevator.

As can now be appreciated, disclosed embodiments provide an accelerated construction technique for concrete steel-reinforced construction projects. With disclosed embodiments, the crane is a mobile, slab-based crane, and as such, it is not considered an in-building crane. Therefore, disclosed embodiments eliminate the costs associated with an in-building crane, such as the cost of renting an expensive crane, insurance, permits, etc.

Although the teachings of this disclosure have been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A method for using a crane for construction of a building with multiple floors, comprising:

building a set of initial floors;

installing a cutout in each floor of the set of the initial floors;

installing upper and lower support collars in the cutouts of one or more floors of the set of initial floors;

installing a plurality of lift ladders in a multi-floor channel formed by the cutouts, wherein the plurality of lift ladders is secured to the upper and lower support collars;

installing an adjustable locking base coupled to a piston system in the multi-floor channel secured into the lift ladders;

installing a tower coupled to the adjustable locking base and piston system, wherein the tower rides in the multi-floor channel and is advanced by the piston system;

positioning a crane over the tower coupled to the piston system;

elevating the crane above a level of a next floor to be constructed;

building the next floor to be constructed;

lowering the crane onto the next floor which has now been constructed;

operating the crane on the next floor which has now been constructed.

2. The method of claim 1, wherein the tower is comprised of multiple removably connected components.

3. The method of claim 1, wherein the tower is comprised of an upper tower component and a lower tower component removably connected to each other.

4. The method of claim 1, wherein the piston system is powered by a hydraulic motor.

5. The method of claim 1, further comprising installing a cutout in subsequent floors.

6. The method of claim 1, wherein the set of initial floors comprises four floors.

7. The method of claim 6, wherein installing an upper and lower support collar includes installing a lower support collar on a first floor of the set of initial floors and installing the upper support collar on a third floor of the set of initial floors.

8. The method of claim 4, wherein elevating the crane comprises activating the piston system powered by the hydraulic motor.

9. The method of claim 8, further comprising securing the tower to a floor slab at the upper support collar with a rod and then raising the adjustable locking base and piston system on the lift ladders by energizing the piston system powered by the hydraulic motor.

10. The method of claim 9, further comprising disengaging the locking base from the lift ladders and the collars and then raising the lift ladders and repositioning the lower collar above the upper collar.

11. The method of claim 10, further comprising re-engaging the adjustable locking base to the repositioned lift ladders and re-engaging the lift ladders to the repositioned lower collar and upper collar and removing the bar securing the tower to the now lower collar.

12. The method of claim 1, wherein the cutout is square.

13. The method of claim 1, wherein the cutout has a size ranging from three feet square to four feet square feet.

14. The method of claim 1, wherein the cutout has a size range a little larger than a cross-section taken up by the crane.

15. The method of claim 14, further comprising raising the crane to the next floor which has now been partially constructed and moving the crane off on the next floor and repeating this process for other items located on a previous floor and then closing in the cutout size to a little larger than the cross-section of the tower.

16. The method of claim 14, wherein, upon completion of construction, the crane lifts and removes the tower, locking base, hydraulic motor, collars and lift ladders by an opening in a top floor of the building and places each item on the ground.

17. The method of claim 16, wherein the crane is disassembled and removed via a freight elevator.

18. A crane lifting system to lift a crane from floor to floor during construction of a building comprising:

a piston system;

an adjustable locking base coupled to the piston system;

a hydraulic power source coupled to the piston system; and a plurality of lift ladders, wherein the plurality of lift ladders is installed within a multi-floor channel of the building, coupled to an upper support collar and a lower support collar affixed in a multi-floor channel, and wherein the hydraulic power source coupled to the piston system is configured and disposed to move a tower along the multi-floor channel.

19. The crane lifting system of claim 18, wherein the hydraulic power source coupled to the piston system is affixed to the adjustable locking base configured and disposed to engage with the plurality of lift ladders.

20. The crane lifting system of claim 19, further comprising a plurality of support collars installed within the multi-floor channel, wherein the plurality of support collars is configured and disposed to mechanically engage with the plurality of lift ladders.

21. The crane lifting system of claim 20, wherein the tower is configured and disposed to move along the multi-floor channel and is comprised of an upper tower section and a lower tower section, wherein the upper tower section and lower tower section are removably fastened together.

22. The crane lifting system of claim 18, wherein the tower is secured at an upper support collar by a rod while the locking base is moved up the lift ladders by energizing the piston system powered by a hydraulic power source affixed to the locking base.

23. The crane lifting system of claim 22, wherein the locking base with piston system is detached from the lift ladders and the lift ladders are raised up.

24. The crane lifting system of claim 23, wherein the lower support collar is removed and repositioned above the upper support collar and the lift ladders are re-secured into the repositioned support collars.

25. The crane lifting system of claim 24, wherein the lift ladders are re-engaged to the locking base and the collars and the rod securing the tower to the upper support collar is removed.

* * * * *